(12) United States Patent
Sweeny et al.

(10) Patent No.: US 12,154,060 B2
(45) Date of Patent: Nov. 26, 2024

(54) UAV FACILITY

(71) Applicant: Flirtey Holdings, Inc., Reno, NV (US)

(72) Inventors: Matthew Sweeny, Reno, NV (US); Jess Hayden, Reno, NV (US); Joseph Rinaldi, Reno, NV (US); John R. Foggia, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 758 days.

(21) Appl. No.: 17/198,083

(22) Filed: Mar. 10, 2021

(65) Prior Publication Data

US 2021/0224739 A1 Jul. 22, 2021

Related U.S. Application Data

(63) Continuation of application No. PCT/US2019/051082, filed on Sep. 13, 2019.

(60) Provisional application No. 62/731,562, filed on Sep. 14, 2018.

(51) Int. Cl.
| | |
|---|---|
| *B64F 1/32* | (2006.01) |
| *B64C 39/02* | (2023.01) |
| *G06F 16/903* | (2019.01) |
| *G06Q 10/083* | (2023.01) |
| *B64U 80/86* | (2023.01) |
| *B64U 101/60* | (2023.01) |

(52) U.S. Cl.
CPC ......... *G06Q 10/083* (2013.01); *B64C 39/024* (2013.01); *B64F 1/32* (2013.01); *G06F 16/90335* (2019.01); *G06Q 10/0838* (2013.01); *B64U 80/86* (2023.01); *B64U 2101/60* (2023.01)

(58) Field of Classification Search
CPC .. G06Q 10/083; G06Q 10/0868; B64C 39/04; B64F 1/32; G06F 16/90335; B64U 2101/60
See application file for complete search history.

(56) References Cited

U.S. PATENT DOCUMENTS

| | | | |
|---|---|---|---|
| 8,620,821 B1* | 12/2013 | Goldberg | B07C 3/006 705/64 |
| 9,244,147 B1* | 1/2016 | Soundararajan | G01S 1/44 |
| 9,412,280 B1* | 8/2016 | Zwillinger | G06Q 10/083 |
| 9,623,760 B2 | 4/2017 | Wang et al. | |
| 9,731,821 B2* | 8/2017 | Hoareau | G05D 1/102 |
| 9,852,317 B2* | 12/2017 | Kuniavsky | G06K 7/10019 |
| 9,957,048 B2* | 5/2018 | Gil | B65G 1/06 |

(Continued)

FOREIGN PATENT DOCUMENTS

| | | |
|---|---|---|
| WO | 2016130112 A1 | 8/2016 |
| WO | 2017120620 A1 | 7/2017 |

OTHER PUBLICATIONS

International Search Report and Written Opinion dated Dec. 9, 2019 for PCT Application No. PCT/US2019/051082.

*Primary Examiner* — Patrick H Mackey
(74) *Attorney, Agent, or Firm* — EIP US LLP

(57) ABSTRACT

Disclosed are transportable unmanned aerial vehicle (UAV) facilities. The facilities comprise a housing having an ingress port arranged to receive a payload for delivery by a UAV. The UAV facility is arranged to determine whether the payload corresponds to a delivery consignment based upon a comparison of one or more determined physical characteristics of the payload with one or more expected characteristics of the delivery consignment.

44 Claims, 19 Drawing Sheets

(56) References Cited

U.S. PATENT DOCUMENTS

| | | |
|---|---|---|
| 10,163,069 B2* | 12/2018 | Borley ............ G06Q 10/08355 |
| 11,068,837 B2* | 7/2021 | Murray ................. G06V 40/10 |
| 2014/0032034 A1 | 1/2014 | Raptopoulos et al. |
| 2014/0180914 A1* | 6/2014 | Abhyanker ........ G06Q 10/0832 |
| | | 705/332 |
| 2015/0120094 A1* | 4/2015 | Kimchi ................ G08G 5/0069 |
| | | 701/3 |
| 2016/0207627 A1* | 7/2016 | Hoareau ............ G06Q 10/0833 |
| 2016/0257423 A1 | 9/2016 | Martin |
| 2017/0313421 A1 | 11/2017 | Gil |
| 2018/0092484 A1 | 4/2018 | Lewis et al. |

* cited by examiner

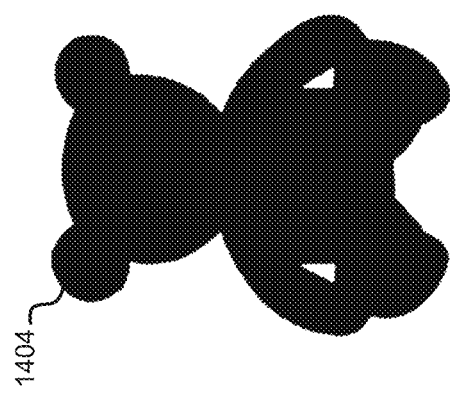
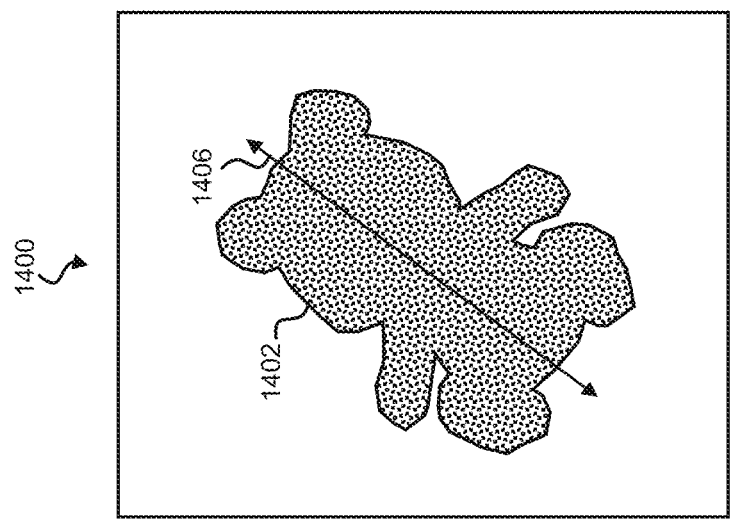

UAV FACILITY

CROSS-REFERENCE TO RELATED APPLICATIONS

This application is a continuation of International Application No. PCT/US2019/051082, filed Sep. 13, 2019 which claims priority to U.S. Provisional Application No. 62/731,562, filed Sep. 14, 2018, under 35 U.S.C. § 119(a). Each of the above referenced patent applications is incorporated by reference in its entirety.

BACKGROUND OF THE INVENTION

Field of the Invention

The present disclosure relates to an unmanned aerial vehicle facility.

Description of the Related Technology

Delivery services offered by commercial carriers deliver goods to recipients. A typical delivery service maintains a large fleet of vehicles, including airplanes, trucks, and small vehicles. Airplanes and trucks move packages between mail sorting facilities, and smaller vehicles move the packages from the sorting facilities to delivery destinations such as homes or businesses. Such delivery services have some drawbacks and may not be efficient in catering to the needs of the consumers or businesses today. For example, such delivery services involve significant investment to procure and maintain the fleet of vehicles, and to manage the human resources required to operate the fleet. Another problem with such delivery services is that they may be incapable of delivering the goods in a short amount of time, such as in a few minutes or hours from the time the order is placed by the consumer. However, even if these delivery services can deliver the goods in a short amount of time, it can be very expensive for the consumer.

An unmanned aerial vehicle (UAV), alternatively referred to herein as a drone, can be utilized to transport packages that can include food, merchandise, or other items. Such a UAV delivery service can overcome some of the problems discussed above with respect to the conventional delivery services; however, the UAV delivery service can still have certain issues that affect the quality of service. For instance, each UAV delivery service typically requires its own UAV facility. These facilities are often costly to build and maintain. In addition, with the high volume of goods being delivered, it is often difficult to ensure the correct payload is being delivered to the correct customer. Delivering the wrong payload to a customer can be frustrating for the customer, while also reducing the efficiency of the delivery service. In addition, it is important to ensure that packages containing sensitive, or potentially harmful contents are either delivered to the correct customer, or not delivered at all if the contents pose a threat.

Accordingly, there is a need for an improved UAV facility which overcomes problems with existing UAV facilities.

SUMMARY

Embodiments described herein relate to devices, systems and methods for storing, processing and deploying UAVs for package deliveries.

According to a first aspect of the present disclosure, there is provided an unmanned aerial vehicle (UAV) facility comprising a housing having an ingress port arranged to receive a payload for delivery by a UAV. The received payload has one or more physical characteristics. The UAV facility further comprises a detector system configured to obtain an identification code and analyze the received payload to determine the one or more physical characteristics. The identification code identifies a delivery consignment. The UAV facility further comprises a payload verification system, configured to determine whether the payload corresponds to the delivery consignment based upon a comparison of the one or more determined physical characteristics with one or more expected characteristics of the delivery consignment, wherein the one or more expected characteristics are determined based upon the obtained identification code. In the event that it is determined that the payload corresponds to the delivery consignment, the payload verification system is configured to accept the payload for delivery by a UAV. In some examples, accepting the payload for delivery by a UAV may include proceeding to conduct the delivery by a UAV.

The determined physical characteristics and the expected characteristics may include weight/mass, size, shape, density, opacity and heat signature, for example.

"A delivery consignment" may relate to an order of one or more items that requires delivery to a customer. For example, a customer may have ordered goods online using the Internet. A delivery consignment may also relate to an order of one or more items that are not yet associated with a particular customer and/or delivery address. For example, the payload may be loaded onto a UAV and the UAV may take flight. During flight, a customer may place an order for the payload, and the UAV may then be routed to a particular delivery location. This allows popular items/payloads to be loaded onto a UAV in anticipation of an order being received in future. This can improve delivery times and reduce congestion at the UAV facility.

"An ingress port", also known as "an ingestion port" is an opening through which the payload can be deposited into the housing. The ingress port may be closeable in some examples.

Such a UAV facility may be used by one or more businesses or individual users to deliver packages to recipients via UAVs. Stand-alone UAV facilities can mean that buildings need not be modified to accommodate UAVs. Businesses, for example, may purchase or rent such a UAV facility and place the UAV facility nearby, such as on a driveway or in a car park. Such a facility therefore saves costs.

A user can deposit a payload, such as a package or object/item, into the UAV facility which may then be automatically loaded onto a UAV before the UAV takes flight and delivers the payload to the customer. Alternatively, a robot, vending machine or conveyor system can deposit the ordered item into the ingress port of the housing.

To ensure that the payload is safe to deliver, or to ensure that the deposited payload correctly corresponds to the ordered item(s) within the delivery consignment, the UAV facility can comprise the payload verification system, which performs a check to ensure that the payload is as expected. The detector system obtains an identification code, and measures, analyses, scans, images or otherwise evaluates the payload to deduce or determine one or more physical characteristics/attributes associated with the payload. For example, the payload may be weighed within the UAV facility. The detector system may obtain the identification code via short range radio communications or by scanning a barcode or QR code on the payload for example.

Using the identification code, a delivery consignment can be identified. From here, one or more expected physical characteristics of the delivery consignment can be determined. For example, the identification code may identify an order for a music speaker that was placed by a customer. The speaker may therefore be expected to have a certain weight. Thus, the identification code can be used to determine one or more expected characteristics of the delivery consignment. Once the weight of the deposited payload has been determined, this can be compared with the expected weight of the delivery consignment. If the received payload is as expected, these two values should be approximately equal. This can be used to determine, within a certain degree of accuracy, that the payload corresponds to the delivery consignment. If the wrong payload has been deposited, the determined weight and the expected weight may differ. If it is determined that the payload corresponds to the delivery consignment, the payload can be accepted for delivery. For example, the UAV facility may cause the payload to be delivered to an identified destination. If it is determined that the payload does not correspond to the delivery consignment, the payload can be rejected for delivery. For example, the UAV facility may move the payload outside of the housing, or may store the payload within the UAV facility without delivering the payload.

Accordingly, the UAV facility can be used to ensure that the correct items are being delivered. This may be particularly useful to enhance security. For example, it may reduce or eliminate harmful or dangerous payloads being delivered to customers in place of other items. One can imagine a scenario where an employee of a delivery service purposefully or accidentally tries to ship a knife, or harmful chemical to an unsuspecting customer who had placed an order for a toy. The payload verification system can inspect the payload to determine whether it corresponds to the ordered item to help avoid such scenarios.

The above described UAV facility can be implemented in a variety of situations. In a first example situation, a takeaway business prepares different sized pizzas, drinks and fries for delivery to customers. A first customer places an order online for a 9-inch pizza, and a small drink. This first order is associated with a first identification code. A second customer places an order for two 14-inch pizzas, two large drinks, and two portions of fries. This second order is associated with a second identification code. An individual prepares the two orders and packages each order in a separate container. A barcode is printed and applied to each container. However, in error, the barcodes may be mixed up, and applied to the wrong container. At a later time, the individual deposits the container into the housing of a UAV facility. The individual places the container into a tray located inside the ingress port and the barcode is scanned to obtain the identification code. The identification code identifies the second order, and therefore the order identifies two 14-inch pizzas, two large drinks, and two portions of fries. By reference to a database, the payload verification system obtains one or more expected characteristics of the second order. For example, the database indicates that these items should be expected to weigh between 1.8-1.9 kilograms. The tray, upon which the container was placed, is connected to a weight sensor to allow the payload to be weighed by the detector system. The measured weight indicates that the weight of the contents of the container is 0.8 kilograms. The payload verification system compares the determined weight with the expected weight and determines that the weights do not correspond. Accordingly, it is deduced that the payload does not correspond to the second order. This is because the container actually contains the first order. The individual can therefore be made aware of this inconsistency and correct the error to ensure the correct payload is delivered to the correct customer.

In a second example situation, an online marketplace receives multiple orders for a number of different items. These items are collected from a variety of different warehouses by a delivery driver in a delivery van. Once the driver is in possession of the items, he drives to the nearest UAV facility. The driver tampers with one of the packages, removes an item, replaces the item with an object of equal weight, and deposits the package into the ingress port. He then manually scans a QR code attached to the payload. The QR code reveals an identification code identifying an order of two items, including a laptop and a mobile phone. The expected weight of the ordered items is determined, and the actual weight of the payload is measured. The payload verification system determines that the weights agree. In addition, the payload is imaged using an x-ray imaging device. The captured x-ray image is analyzed by an image recognition system and it is determined that the payload comprises an item having a shape that represents a laptop and an item that has a shape that does not resemble a mobile phone. The payload verification system thus determines that the payload does not correspond to the order and the payload is not accepted for delivery. The online marketplace can be made aware that the payload was not delivered, and further investigation may reveal that the van driver had stolen the mobile phone. Other example situations are envisaged.

In some examples the detector system comprises a controller, such as a processor, configured to execute a set of instructions to cause the detector system to obtain the identification code and analyze the received payload. Similarly, the payload verification system may also comprise a controller, such as a processor, to execute a set of instructions to cause the payload verification system to determine whether the payload corresponds to the delivery consignment and to accept the payload for delivery. In some arrangements a single controller is common to the detector system and payload verification system, and executes both sets of instructions. This avoids the need for two or more separate controllers. Such a single controller may also control other operations of the UAV facility, which are described herein.

In some examples, the UAV facility is transportable, and may be suitable for outdoor use. For example, the housing may be mounted upon wheels so that it can be towed by a vehicle. Alternatively, the UAV facility may itself be a vehicle, such as a "self-driving vehicle" which can navigate to a destination autonomously or semi-autonomously. In one example the UAV facility is a mobile kitchen. Food and drink orders can be prepared and or cooked within, or at the kitchen, before being delivered by UAVs. In some arrangements goods for delivery are stored within the UAV facility and a user may order an item which is automatically dispensed and delivered by a UAV. In this way the UAV facility itself may act as a vending machine.

The UAV facility may comprise a landing surface upon which the UAV may land and take off. The landing surface may be an external surface of the housing, or it may be an additional surface mounted or attached to an outer surface of the housing.

In some arrangements, the payload verification system is further configured to obtain the one or more expected characteristics of the delivery consignment, based upon the obtained identification code and compare the one or more determined physical characteristics with the one or more expected characteristics. Accordingly, the payload verification system itself performs the comparison of the determined physical characteristics with the expected characteristics, rather than the comparison being performed by a remote server, for example. This can reduce the processing demand of the remote server.

In one example, in order to obtain the one or more expected characteristics of the delivery consignment, the payload verification system is configured to receive the one or more expected characteristics from a remote server. For example, the payload verification system may query a remote server for one or more expected characteristics of an item or items associated with a delivery consignment. The remote server may store more accurate, specific, or current characteristics associated with the delivery consignment. This also reduces the need for the payload verification system to itself store a database of expected characteristics.

In one particular example, in order to obtain the one or more expected characteristics of the delivery consignment, the payload verification system is further configured to transmit, to the remote server, a request for the one or more expected characteristics, where the request comprises the identification code. For example, the payload verification system can send the identification to a remote server, such as a server associated with a delivery service. Upon receiving the identification code, the remote server can return data indicating the one or more expected characteristics.

In one arrangement, the payload verification system is configured to determine, based on the identification code, an item associated with the delivery consignment, and to obtain the one or more expected characteristics of the delivery consignment. The payload verification system is further configured to retrieve, from a database, the one or more expected characteristics using data identifying the item, where the database comprises data indicating one or more expected characteristics associated with each of a plurality of items, the plurality of items including the determined item. Accordingly, the UAV facility may comprise memory to store a number of expected characteristics associated with a number of items in a database. This can reduce delays that may be introduced by querying a remote server e.g. when connectivity is an issue. Returning to the first example situation described above, the UAV facility may keep a record of items offered for delivery by a pizza restaurant. The database may store one or more expected characteristics, such as the weight, associated with each item that can be delivered. In another example, the payload verification code can send the identification code to a remote server. The remote server may return a list of one or more items. Alternatively, the items may be deducible from the identification code.

In other arrangements, the payload verification system is configured to transmit the identification code and the one or more determined physical characteristics to a remote server that is configured to compare the one or more determined physical characteristics with the one or more expected characteristics. Accordingly, unlike the example above, the comparison is performed by remote server rather than the payload verification system. This can simplify the operation of the UAV facility. In response the transmitting the identification code and the one or more determined physical characteristics, the payload verification system receives, from the remote server, an indication of a result of the comparison, and using the received indication, determines whether the payload corresponds to the delivery consignment. For example, the remote server can perform the comparison and transmit to the payload verification system data to indicate whether the characteristics match. If they do not match, the remote server may also include data indicating why they do not match.

The UAV facility may further comprise an order receipt system configured to transmit the identification code to a remote delivery tracking system, thereby to indicate that the UAV facility has received the payload. Accordingly, the identification code may also be used as a tracking identification code so that a user can monitor the progress of the payload delivery. A user can access the delivery tracking system and enter their identification code to determine the location of the payload. By receiving the identification code, the delivery tracking system can update the status to indicate that the payload has been received by the UAV facility.

In one particular example, such as in the first example situation described above, the identification code is a meal order identification code identifying a meal delivery consignment. For example, the pizza restaurant may generate an identification code associated with a meal order. Alternatively, the identification code may be one of an ecommerce identification code identifying an ecommerce delivery consignment, a medicine identification code identifying a medicine delivery consignment, and a grocery identification code identifying a grocery delivery consignment. The ecommerce delivery consignment may be an order placed with an ecommerce business, and may include various types of items, including convenience items.

The UAV facility may also comprise a platform arranged to receive the UAV, a drive system configured to lower the platform, thereby to lower the UAV from a position outside the housing to a position inside the housing. The UAV facility may also comprise a payload positioning mechanism arranged to move the payload between an initial position and a loading position, wherein the loading position is arranged beneath the platform and the payload is engageable by the UAV when the payload is at the loading position. The moveable platform may form part of the landing surface described above. Accordingly, a UAV can be positioned on the moveable platform and by moving the platform the UAV can be moved inside the housing so that the payload can be loaded onto the UAV before it is delivered. The payload positioning mechanism moves the payload from the ingress port to a position below the moveable platform. In this position, the UAV can take hold of the payload. For example, the UAV may comprise a retractable tether comprising a coupling mechanism at one end. The coupling mechanism may engage a corresponding engagement mechanism on the payload. As the UAV retracts the tether, the payload may be lifted towards the UAV, and may be stored within a compartment during flight. In a specific example, the platform delimits an aperture through which the payload can pass. The UAV can extend the tether through the aperture to engage the payload located below.

The drive system may comprise a controller which controls/instructs the movement of the platform. The drive system may comprise one or more motors, or actuators, for example, which operate to move the platform.

In a first arrangement, the payload positioning mechanism comprises a retractable arm and a tray to receive the payload is mounted on the retractable arm. The retractable arm is moveable between an extended position and a retracted position. When the retractable arm is arranged in the extended position, the tray is positioned to receive the payload at the initial position, and when the retractable arm is arranged in the retracted position the tray is positioned beneath the platform. The retractable arm therefore provides a compact mechanism by which to move the payload within the housing. The retractable arm may be a telescopic arm. The tray may be moveably mounted on the retractable arm to allow the tray to slide along at least a portion of the moveable arm. This can allow a more precise maneuverability of the tray and payload.

The retractable arm may extend out of the housing when the retractable arm is arranged in the extended position. For example, the arm may fully or partially extend through the ingress port. This arrangement can mean it is easier for a user to deposit the payload into the tray. The arrangement can also increase security by blocking or restricting access into the housing via the ingress port.

In a second arrangement, the payload positioning mechanism comprises at least one guide rail extending between at least the initial position and the loading position and a tray to receive the payload. The tray is moveably mounted on the at least one guide rail, thereby facilitating movement of the payload from the initial position to the loading position. This mechanism can simplify the design and operation of the UAV facility.

In a particular example, the ingress port may be referred to as a first ingress port, and the housing may comprise a second ingress port. The at least one guide rail may be arranged such that it extends between the first ingress port and the second ingress port. The sharing of the guide rail between ingress ports simplifies the mechanical and electrical design for moving the tray from the ingress port to a location below the moveable platform. In some embodiments, the two ingress ports located across from each other may share one tray.

In a third arrangement, the payload positioning mechanism comprises a conveyor system configured to move the payload from the initial position to the loading position. For example, the conveyor system may comprise a conveyor platform/belt and one or more rollers which rotate to move the conveyor platform. This arrangement can simplify operation because a tray does not need to be moved into the correct position each time a payload is deposited.

As mentioned above, the one or more physical characteristics of the payload may comprise a weight of the payload and the one or more expected characteristics of the delivery consignment comprises an expected weight of the delivery consignment. Accordingly, the detector system may comprise a weight sensor configured to obtain weight sensor data associated with the payload and may be configured to determine the weight of the payload based on the weight sensor data.

In arrangements where the payload positioning mechanism comprises a tray, the weight sensor may be coupled to the tray such that displacement of the tray generates the weight sensor data. In arrangements where the payload positioning mechanism comprises a conveyor system comprising a moveable conveyor platform, the weight sensor may be coupled to the conveyor platform such that displacement of the conveyor platform generates the weight sensor data. By integrating the weight sensor into the payload positioning mechanism, the weight of the payload can be analyzed without requiring either (i) the payload to be transported to a separate location to be weighed, or (ii) requiring the user to place the payload upon a separate unit to be weighed.

In one arrangement the detector system comprises a scanner configured to read a machine-readable marker located on the payload, thereby to obtain the identification code. For example, the payload may comprise a barcode, or QR code which can be read by the scanner. A business owner may apply the marker to the payload before depositing it into the ingress port. In another example, the scanner may be additionally or alternatively be configured to detect a signal from a RFID tag present on the payload. In a further example, a user depositing the payload may manually enter the identification code into a keyboard terminal located at the UAV facility. In a further example, the identification code may be transmitted to the detector system via a Bluetooth, Wi-Fi or Infrared connection with a computing device, such as a handheld device of the user depositing the payload. The scanner may be arranged outside or inside of the housing. Being arranged outside of the housing allows a user to more accurately position the payload so that the marker can be read by the scanner.

In certain example UAV facilities, the detector system comprises at least one imaging device configured capture an image of the payload such that at least one of the one or more physical characteristics of the payload are derivable from the captured image. For example, the imaging device may be a camera capable of detecting electromagnetic radiation such as visible light, infrared, or ultraviolet. The captured image may be used to obtain the one or more physical characteristics. For example, one or more dimensions or the shape of the payload may be derived from the captured image. Thus, these determined physical characteristics can be compared with expected characteristics. Any number of image processing operations may be used to determine the physical characteristics from the captured data. Visible light imaging devices may be useful in cases where the payload is not covered by packaging.

In a particular example, the imaging device comprises an electromagnetic radiation source configured to irradiate the payload and an electromagnetic radiation detector configured to detect an electrometric radiation signature of the payload. The detected electromagnetic radiation signature is used to generate the captured image. For example, x-rays may irradiate the payload in order to produce an x-ray image of the payload. This may be particularly useful if the payload comprises an object, or objects, within a package or container.

As mentioned above, the one or more determined physical characteristics of the payload may comprise a shape of the payload, and the one or more expected characteristics of the delivery consignment may comprise an expected shape of the delivery consignment. Accordingly, the payload verification system may comprise an image recognition system configured to determine the shape of the payload based on the captured image. As such, the image recognition system may determine the shape of the payload which is compared with an expected shape of the payload. The image recognition system may additionally determine from the shape that the payload comprises an object of a certain type, such as a laptop or mobile phone, as described in the second example situation above. Accordingly, the payload verification system may instead compare the determined object type with an expected object type. The image recognition system may also determine the expected shape of the delivery consignment by analyzing an image of an item, or items, that are part of the delivery consignment.

The "shape" of the payload may be represented by a two-dimensional or three-dimensional model.

As mentioned above, the one or more physical characteristics of the payload may comprise at least one size dimension of the payload, and the one or more expected characteristics of the delivery consignment may comprise at least one expected size dimension of the delivery consignment. Accordingly, the detector system may comprise one or more sensors configured to obtain sensor data associated with the payload. The detector system is configured to determine the least one size dimension of the payload based on the sensor data. The one or more sensors may be part of the imaging device.

Certain payloads may cause electromagnetic interference with electronic components on board the UAV. Example electronic components include positioning instruments, such as a GPS instrument. Payloads which cause unacceptable levels of interference may be packaged in a special container capable of absorbing electromagnetic signals emitted by the payload, or may be rejected for delivery. Accordingly, the detector system may further comprise an electromagnetic interference detector configured to detect a signal emitted by the payload and to determine, based on the signal, whether the payload would cause electromagnetic interference with electronic components of the UAV, such as a GPS sensor or compass.

To further enhance the security of the delivery system, the detector system may comprise a hazardous material detection system configured to determine whether the payload comprises hazardous materials. In the event that it is determined that the payload comprises hazardous materials, delivery of the payload can be aborted. This avoids dangerous packages being delivered. In a particular example, the hazardous material detection system comprises a fan arranged to cause fluid to move relative to the payload and a detector arranged to detect whether the fluid comprises particles associated with explosive or combustible devices. The fan can blow air across the payload and any particles associated with explosive or combustible devices may be entrained within the air before being detected. Thus, in some examples, the hazardous material detection system may be an explosive device detection system. In an alternative example, the package may be swabbed and the contents of the swab analyzed by the detector. In one example, the hazardous material detection system determines whether the payload comprises flammable materials. The hazardous material detection system may also detect radioactive and/or biological materials.

In certain example UAV facilities, the detector system comprises at least one imaging device configured capture an image of the payload. An image recognition system may be configured to determine whether the payload is packaged correctly. For example, the payload may be a container and the image recognition system may use machine learning to determine whether the container is secure. The container may have one or more flaps which are secured when the container is constructed, and the image recognition system may determine if one or more of these flaps are loose. If the container is not secured correctly it may open during flight, and objects within the container may fall out and potentially injure someone. The image recognition system may also determine whether the structural integrity of the payload is compromised. For example, it may be able to deduce if the container is weakened. If the image recognition system determines that the payload is not secure and/or the structural integrity has been compromised, it may reject the payload for delivery.

The UAV facility may further comprise a user terminal arranged outside of the housing, wherein the user terminal is configured to receive authentication data and provide access to the ingress port based on the authentication data. The user terminal therefore enhances security of the facility by providing access to only those who are authorized.

The authentication data may be received via a computing device, or may be entered by a user manually. In one example, the authentication data is generated based on biometric data of the user. For example, a facial scanner may image a user's face to generate authentication data as part of a facial recognition procedure.

In some arrangements the UAV facility comprises a payload packaging station, configured to receive the payload and package the payload in a container, where the container is dimensioned to be transported by the UAV. Thus, if the payload comprises packaging that renders it difficult to deliver the payload via the UAV, or has no packaging, the payload can be packaged in a container that is suitable for delivery. The container, for example, may have certain dimensions to allow the container to be carried by the UAV. The container may alternatively or additionally comprise an engagement mechanism to allow the container to be engaged by a corresponding coupling mechanism that is part of the UAV. The payload packaging station therefore allows and/or improves transportation of the payload by a UAV.

In one arrangement, the payload packaging station is configured to determine, based on the identification code, whether the received payload is already packaged in a standard container, wherein the standard container comprises an engagement mechanism configured to engage a coupling mechanism of the UAV. In the event that it is determined that the payload is not already packaged in the standard container, the payload packaging station can deposit the payload in the container. For example, the identification code may be used to identify whether the payload is likely to be packaged in a container suitable for delivery by the UAV. Certain businesses, such as the pizza restaurant described above, may ensure that the food packaging is always packaged within a standard container. This can be determined using the identification code, which may indicate the particular type of business and thus payload. Other businesses may use non-standard packages, so the payload may need to be appropriately packaged before delivery.

In some examples, the housing comprises a payload storage facility and the payload positioning mechanism is further arranged to move the payload from the initial position to the payload storage facility, thereby to store the payload for period of time. After the period of time has elapsed, the payload positioning mechanism is further arranged to move the payload from the payload storage facility to the loading position. This allows the payload to be temporarily stored before being delivered by a UAV. This can be useful if there are no available UAVs to deliver the package, if the weather conditions are not suitable for delivery, or in order to meet a pre-scheduled delivery time.

In certain examples, the one or more physical characteristics of the payload comprises a center of mass of the payload. The detector system comprises two or more sensors configured to obtain sensor data associated with the payload and the detector system is configured to determine the center of mass of the payload based on the sensor data. The sensors used to calculate the center of mass may be weight, mass or force sensors. In a particular example, the sensors are load sensors or load cells which measure the force applied to the sensor.

The detector system may therefore be able to measure or calculate the center of mass of the payload. The center of mass may be useful to know because it can affect the handling of the UAV during flight. For example, the payload may comprise a container and within the container may be an object that is located towards one side of the container such that the center of mass may not coincide with the geometric center of the container's footprint/base. In that case, the container may rotate or tilt when suspended from the UAV by a tether. This may in turn cause the UAV to experience a moment of force and rotate/tilt meaning that one or more rotors may need to generate more lift to keep the UAV level. This moment of force can cause the motors of the rotors to wear out faster than normal and/or may make it more difficult to maneuver the UAV. In some cases, the UAV may not be able to fly safely, depending upon the magnitude of the force. Accordingly, it may be useful to calculate the center of mass of the payload to determine whether the payload would impact the flight of the UAV. If the center of mass is located far from the geometric center of the container's, or payload's, footprint, the payload may be rejected by the UAV facility. In some examples, the mass of the payload is also taken in to account when determining whether to reject the payload.

The payload may be placed on a surface, in which case the sensors may be arranged under, or integrated within, the surface. In some examples, there are three or four sensors. In a particular example there are four sensors, each of which is arranged at, or towards each corner of a surface onto which the payload is placed.

In one example, the payload verification system is configured to determine whether the payload corresponds to the delivery consignment based upon a comparison of the determined center of mass with an expected center of mass of the delivery consignment.

In some examples, the payload verification system is configured to determine whether the center of mass of the payload satisfies a center of mass criterion and, in the event that the center of mass of the payload satisfies the center of mass criterion, the UAV facility is configured to accept the payload for delivery by a UAV. For example, the center of mass measurement may be a location coordinate within the footprint of the payload, and the criterion may be satisfied if the center of mass is located within a predetermined area, or is located within a predetermined distance from another location (such as the geometric center of the payload's footprint). Thus, in some examples, the center of mass criterion comprises a threshold distance or a range of acceptable locations. The center of mass criterion may also be based on the mass of the payload. For example, the predetermined area and distance may be larger for lower mass payloads.

In some arrangements, in the event that the center of mass of the payload does not satisfy the center of mass criterion, the UAV facility is configured to reject the payload for delivery by a UAV. For example, if the center of mass is outside of the predetermined area, the payload may be rejected.

In one example, in the event that the center of mass of the payload does not satisfy the center of mass criterion, the UAV facility is configured to adjust a position of the payload, and after the position of the payload has been adjusted, the detector system is configured to obtain second sensor data associated with the payload, the detector system is configured to determine a second center of mass of the payload based on the second sensor data, and the payload verification system is configured to determine whether the second center of mass of the payload satisfies the center of mass criterion. Accordingly, the UAV facility may reposition the payload in an attempt to satisfy the center of mass criterion. Once repositioned, the detector system performs a further check to determine whether it now satisfies the criterion. These steps may be repeated a predetermined number of times before finally rejecting the payload if it still fails to satisfy the criterion.

Adjusting the position of the payload may comprise adjusting the center of mass of the payload.

Adjusting the position of the payload may comprise adjusting a position of the contents of the payload. The UAV facility may comprise one or more components to reposition, such as rotate or move the one or more objects of the payload. For example, when payload comprises a container one or more objects located within the container may be moved inside the container. In some examples, the container may be rotated, without repositioning the contents. This may be useful if the predetermined area is not symmetrical about a geometric center of the footprint of the payload.

In a particular example, in the event that the center of mass of the payload does not satisfy the center of mass criterion, a payload positioning mechanism is configured to move the payload to a location such that a user can adjust a position of the payload. For example, the payload may already be located within the housing of the UAV facility and may need to be moved so that a user can adjust the center of mass of the payload.

In another example, the UAV facility may alert/notify a user to adjust a position of the payload. For example, the user may be notified that the payload will be rejected unless the payload is adjusted. A screen may display an alert or notification requesting that the user adjust the payload. In some examples, the payload may be stored in a payload storage facility until a user has adjusted the center of mass of the payload.

As previously mentioned, the UAV facility may comprise a payload positioning mechanism to move the payload between an initial position and a loading position. The payload positioning mechanism may comprise a tray to receive the payload, where the tray is moveable between the initial position and the loading position. The payload is received at the initial position and is engageable by the UAV at the loading position. The two or more sensors may be coupled to the tray such that displacement of the tray generates the sensor data.

Thus, the positioning mechanism may also be used to determine the center of mass. The tray may have one or more sidewalls so as to contain the payload. Alternatively, the tray may be a platform or surface without sidewalls.

In some examples, the UAV facility comprises an agitator mechanism configured to agitate the payload after the detector system has determined the center of mass of the payload. After the payload has been agitated, the detector system is configured to obtain third sensor data associated with the payload, the detector system is configured to determine a third center of mass of the payload based on the second third data, and the payload verification system is configured to determine whether the third center of mass is substantially the same as the previously determined center of mass.

Agitating the payload may comprise tilting the payload, rotating the payload or "shaking" the payload, for example. The payload is agitated to determine whether the contents of the payload move. For example, the contents of a container may move within the container if they are loose within the container. If the contents of the container move upon agitation, the center of mass may move as a result. A moving center of mass (rather than a fixed center of mass) may cause problems during flight. It may therefore be important to determine whether the center of mass is different after agitation. The payload may be rejected if the center of mass moves, or if it moves and no longer satisfies the center of mass criterion. In some examples, the payload may be rejected if the center of mass has moved, but still satisfies the criterion. The decision to reject the payload may also be based on the mass of the object. For example, a payload having a relatively light mass may be accepted for delivery even if it moves upon agitation.

The agitator mechanism may be part of the payload positioning mechanism. In one example, the agitator mechanism adjusts an incline of the tray that receives the payload.

In one example, the center of mass criterion is dependent upon one or more weather characteristics. For example, in windy conditions, the center of mass criterion may be stricter. For example, the predetermined area and distance may be smaller during high winds. In a particular example, in low, or no winds the predetermined area may be the same size as the area of the payload's footprint.

In certain arrangements, the payload verification system is configured to determine the one or more weather characteristics and determine the center of mass criterion based on the determined one or more weather characteristics.

Determining the one or more weather characteristics may comprise receiving, from a remote server/source, an indication of the one or more weather characteristics. Additionally, or alternatively, determining the one or more weather characteristics may comprise measuring, at the UAV facility, the one or more weather characteristics. For example, the UAV facility may comprise one or more instruments configured to measure one or more weather characteristics, such as wind speed.

The one or more weather characteristics may be current or future estimated weather characteristics. The one or more weather characteristics may be indicative of the weather at the current location of the UAV facility and/or the UAV's delivery location and/or a location along the expected flight path of the UAV.

In one example, the UAV facility can determine the exterior or outer shape of the payload. For example, the outer shape of the container may be determined. Once determined, the payload may be categorized as being either safe to jettison by the UAV during flight, or not safe to jettison. The UAV may need to jettison the payload in an emergency situation to reduce its weight or conserve power, for example. Accordingly, the one or more physical characteristics of the payload comprises an exterior shape of the payload and the detector system comprises an image recognition system configured to determine the exterior shape of the payload based on the captured image. The UAV facility may further comprise a safety system configured to categorize the payload, based on the exterior shape, as being one of (i) suitable to jettison by the UAV during flight and (ii) not suitable to jettison by the UAV during flight. Data indicative of the exterior shape and/or category can be transmitted to the UAV.

In another example, the UAV facility can determine the impact resistance of the payload, which is to say its ability to withstand a force applied to the payload. This may be used by the UAV during delivery. For example, a payload that is deemed to have a high impact resistance may be dropped by the UAV from a particular height during delivery of the payload rather than landing the UAV or placing the payload on the ground. Accordingly, the one or more physical characteristics of the payload comprises an impact resistance of the payload and the detector system is configured to determine the impact resistance of the payload. The UAV facility may be configured to transmit, to the UAV, data indicative of the impact resistance. This data may be used by the UAV when the payload is delivered. In another example, the data may be used by the UAV to determine whether or not to jettison the payload during an emergency situation.

In another aspect, another UAV facility is provided, where the UAV facility comprises a housing having an ingress port arranged to receive a payload for delivery by a UAV, wherein the received payload has one or more physical characteristics and is associated with a delivery consignment. The UAV facility further comprises a detector system, configured to analyze the received payload to determine the one or more physical characteristics. The UAV facility further comprises a payload verification system configured to determine whether the payload corresponds to the delivery consignment based upon a comparison of the one or more determined physical characteristics with one or more expected characteristics of the delivery consignment. The payload verification system is further configured to accept the payload for delivery by a UAV in the event that it is determined that the payload corresponds to the delivery consignment. The UAV facility may have any or all of the features of the UAV facility described in the first aspect.

In such an aspect, the payload may be associated with a particular delivery consignment because the payload has been received at a certain time, for example within a certain time period. Alternatively, the payload may be associated with a particular delivery consignment because the payload has been received within a certain ingress port. Alternatively, the payload may be associated with a particular delivery consignment because the payload has been received within a certain ingress port at a certain time. Alternatively, the payload may be associated with a particular delivery consignment because the payload comprises an identifying feature, such as a marker or a type of packaging, which allows the payload to be associated with the particular delivery consignment. Accordingly, the detector system may further be configured to determine the identifying feature.

In one particular example, the detector system may further be configured to obtain an identification code, wherein the identification code identifies the delivery consignment. Thus, in this example, the one or more expected characteristics may be determined based upon the obtained identification code. The identification code may be determined and used in any of the ways previously described.

In another aspect, a UAV system is provided. The UAV system comprises a UAV configured to deliver a payload, wherein the payload has one or more physical characteristics and is associated with a delivery consignment, and wherein the UAV comprises a detector system configured to analyze the payload to determine the one or more physical characteristics. The UAV system further comprises a payload verification system configured to determine whether the payload corresponds to the delivery consignment based upon a comparison of the one or more determined physical characteristics with one or more expected characteristics of the delivery consignment. In the event that it is determined that the payload corresponds to the delivery consignment, the UAV accepts the payload for delivery. In an example, the UAV comprises the payload varication system. In another example, at least some of the payload verification system functions are performed by a remote server. For example, the UAV may transmit, to the remote server, data indicative of the one or more physical characteristics.

Accordingly, in this aspect, the UAV may comprise a system and/or components to analyze the payload. This may be useful if the UAV is required to collect a payload from a first location and deliver the payload to a second location. In this case and before the UAV delivers the payload, a number of checks will be performed to determine whether the payload it is collecting is the correct payload associated with the delivery consignment. The system and/or components may comprise weighing apparatus configured to weigh the payload as it suspends from the UAV and/or determine a center of mass of the payload. The system and/or components may also comprise an imaging device to image the payload. For example, an image recognition system can determine whether the imaged payload corresponds to the payload associated with the delivery consignment.

In one example, the detector system receives data indicative of an image of the payload that is to be collected. The data indicative of the image may be received directly or indirectly from a user device. For example, a user may capture an image of the payload, which is then transmitted to the detector system of the UAV. An image recognition system can again determine whether the imaged payload corresponds to the payload associated with the delivery consignment. This is useful because the UAV need not necessarily have its own imaging device.

The UAV and/or the UAV system may have any or all of the features of the UAV facility described in any of the other aspects. For example, the UAV may comprise components to check whether the payload comprises hazardous materials, and/or check whether the payload would cause electromagnetic interference.

In another aspect, a UAV facility is provided. The UAV facility comprises a housing having an ingress port arranged to receive a payload for delivery by a UAV, wherein the received payload has one or more physical characteristics. The UAV facility further comprises a detector system configured to analyze the received payload to determine the one or more physical characteristics. The UAV facility may have any or all of the features of the UAV facility described in the aspects described above.

In a first example, the one or more physical characteristics of the payload comprises a center of mass of the payload. The detector system comprises two or more sensors configured to obtain sensor data associated with the payload and the detector system is configured to determine the center of mass of the payload based on the sensor data. A decision on whether to accept or reject the payload for delivery can be taken.

In a second example, the one or more physical characteristics of the payload comprises an exterior shape of the payload and the detector system comprises an image recognition system configured to determine the exterior shape of the payload based on a captured image of the payload. The UAV facility further comprises a safety system configured to categorize the payload, based on the exterior shape, as being one of (i) suitable to jettison by the UAV during flight, and (ii) not suitable to jettison by the UAV during flight.

In a third example, the one or more physical characteristics of the payload comprises an impact resistance of the payload. The detector system is configured to determine the impact resistance of the payload and the UAV facility is configured to transmit, to the UAV, data indicative of the impact resistance.

In another exemplary embodiment, a further UAV facility is disclosed. This UAV facility, which may also be referred to as a drone delivery system, comprises a housing (also known as a container), which may have a base and a roof. The roof is located above the base, and includes a center section that extends lengthwise along a center of the roof and includes one or more openings. The roof includes one or more landing surfaces located adjacent to the center section and is structured to allow a drone to land on the one or more landing surfaces. The housing also includes a plurality of side surfaces located in between the base and the roof. The UAV facility includes one or more drone delivery platforms, a UAV positioning mechanism (also referred to as a drone positioning system) located on top of the roof, and one or more ingress ports located on at least one of the side surfaces of the housing which are structured to receive a delivery package/payload.

In some embodiments, the UAV includes an extendable cable/tether with an attachment that affixes to the payload or a package. In some embodiments, the one or more drone delivery platforms are one or more elevator platforms. In some embodiments, the one or more drone delivery platforms are located lengthwise along the center of the roof. Each drone delivery platform includes a hole covered by a panel. At least one drone delivery platform is movably coupled to one or more vertical bars located inside the housing, and at least one drone delivery platform is configured to move up to each opening in the center section and to move down inside the housing to a predetermined height above the base.

In some embodiments, at least one ingress port includes a door and a scanner to scan a machine-readable code on the payload. In some embodiments, each of the one or more ingress ports is located below each of the one or more landing surfaces. In some embodiments, at least one ingress port is located across from at least one other ingress port.

An example drone positioning system of the UAV facility comprises at least two rail guides located on opposite ends of each of the one or more landing surfaces and extending towards the center section, and at least one bar located at a distal end of each of the one or more landing surfaces and configured to move laterally along the at least two rail guides to move each drone from its landing surface to at least one drone delivery platform located adjacent to the landing surface. The drone positioning system includes a plurality of hinges located of top of each rail guide in between the center section and each of the one or more landing surfaces to allow the one or more of landing surfaces to be folded on top of the center section. Each of the at least two rail guides extends towards the center section and wherein each of the at least two rail guides include a proximal end curved inwards to facilitate positioning of the drone onto at least one drone delivery platform.

The UAV facility further includes at least one user interface/terminal located on at least one side surface; the user interface may be configured to display an availability of the UAVs for delivery and configured to open and close one or more closable panels, such as doors, corresponding to the one or more ingress ports.

The UAV facility may further include one or more tracks/guide rails located above the base of the housing, and one or more holding trays movably coupled to one or more tracks, wherein each holding tray in a first position is located adjacent to at least one ingress port to receive the payload and each holding tray is positionable to a location below the hole of at least one of the drone delivery platforms. In some embodiments, each track runs between two ingress ports located across from each other.

In some embodiments, the roof of the UAV facility includes landing patterns located on top of each of the one or more landing surfaces.

The UAV facility further includes a plurality of battery charging bays mounted inside the housing, wherein each battery charging bay is configured to charge a plurality of batteries. Each battery charging bay is operable to determine characteristics of each battery.

The UAV facility further includes a robotic arm movably coupled to one or more holding rails inside the housing. In embodiments, the robotic arm may be affixed with or incorporate one or more mechanisms to grab and move objects (e.g., packages, batteries, etc.). The robotic arm may be a three-axis robotic arm, which is configured to remove a first battery installed in the drone, plug in the first battery in one of the battery charging bays, remove a second battery from one of the battery charging bays, and install the second battery in the drone.

The UAV facility may further include a robot to transfer a package from a store to the UAV facility. In an exemplary embodiment, a method for processing a package is disclosed. The method comprises selecting a drone to deliver a package from a housing, opening an ingress port on the housing, receiving the package in a holding tray, closing the ingress port, moving the holding tray with the package to a location below a drone delivery platform including a drone, affixing the package to an attachment of the drone, and sending the drone to a destination to deliver the package.

In some embodiments, the selecting of the drone, the opening of the ingress port and the closing of the ingress port is performed by a user interface. The opening of the ingress port opens a door of the ingress port that corresponds to the selected drone, and the closing of the ingress port closes the door of the ingress port that correspond to the selected drone.

The drone may be moved from a landing surface to the drone delivery platform, wherein the drone delivery platform includes a hole covered by a panel, moving down the drone delivery platform including the drone, opening the panel to allow the attachment of the drone to access the package in the holding tray located below the hole of the drone delivery platform, moving up the drone delivery platform with the drone and the package coupled to the attachment, and closing the panel of the drone delivery platform. In some embodiments, the drone delivery platform is an elevator platform.

In some embodiments, the coupling of the package to an attachment of the drone comprises lowering from the drone a cable including the attachment to couple the attachment to the package.

The exemplary method further includes charging a plurality of batteries in a battery charging bay, and replacing a first battery of the drone with one of the batteries from a battery charging bay. The battery charging bay scans the battery to determine battery characteristics.

The exemplary method further includes scanning the package in the holding tray to obtain information about the package, and determining delivery related information for the selected drone. The exemplary method further includes confirming that the package is received by the drone.

The exemplary method further includes alerting of a non-conformity event that include one or more of absence of a battery in the drone, absence of the drone for delivery, unexpected weather conditions, postponing delivery, and cancelling delivery.

In another exemplary embodiment, having selected a drone for delivery of a package and received the package for delivery, the package can be affixed to an attachment of the drone. More particularly the affixing of the package to an attachment of the drone may comprise moving the drone from a landing surface to an drone delivery platform comprising a hole, moving the holding tray with the package to a location below the hole of the drone delivery platform, and lowering from the drone a cable including the attachment to affix the attachment to the package. In some embodiments, the drone delivery platform is an elevator platform.

The drone delivery platform may then be moved, the drone delivery platform including a panel to cover the hole, opening the panel of the drone delivery platform to allow access to the drone, and moving the drone delivery platform with the drone and the package. Thereafter the panel of the drone delivery platform can be closed.

In some embodiments, the selecting of the drone, the opening of the ingress port and the closing of the ingress port is performed by a user interface. In some embodiments, the opening of the ingress port opens a door of the ingress port that corresponds to the selected drone, and the closing of the ingress port closes the door of the ingress port that correspond to the selected drone.

Further features and advantages of the disclosure will become apparent from the following description of preferred embodiments of the disclosure, given by way of example only, which is made with reference to the accompanying drawings.

BRIEF DESCRIPTION OF THE DRAWINGS

FIG. 14A depicts a captured image of a payload in accordance with an example;

FIG. 14B depicts an image of an expected delivery consignment in accordance with an example;

DETAILED DESCRIPTION OF CERTAIN INVENTIVE EMBODIMENTS

Disclosed are example UAV facilities. A UAV facility is a unit which can house a UAV, store packages, provide a landing surface, or act as a UAV battery charging/replacement unit.

In some embodiments, one or more UAVs are stored in or on a UAV facility, such as on top of a housing. The UAV facility may be, for example, a mobile trailer. One benefit of storing the UAVs at these facilities is that it reduces the time necessary to task a UAV to process an order and receive a payload/package for delivery. For instance, when the exemplary system receives a command to deliver a payload, one of the UAVs placed on top of a housing is processed to attach the payload to the UAV. The processing of the UAVs can be automated to reduce processing time. For example, during the processing operation, a UAV's battery may be automatically swapped with a fully charged battery. The UAV is deployed for delivery when the exemplary system has processed the UAV. Thus, the UAV delivers goods instantaneously, for example, within a few minutes or hours from the time a consumer places an order.

Figure 1:
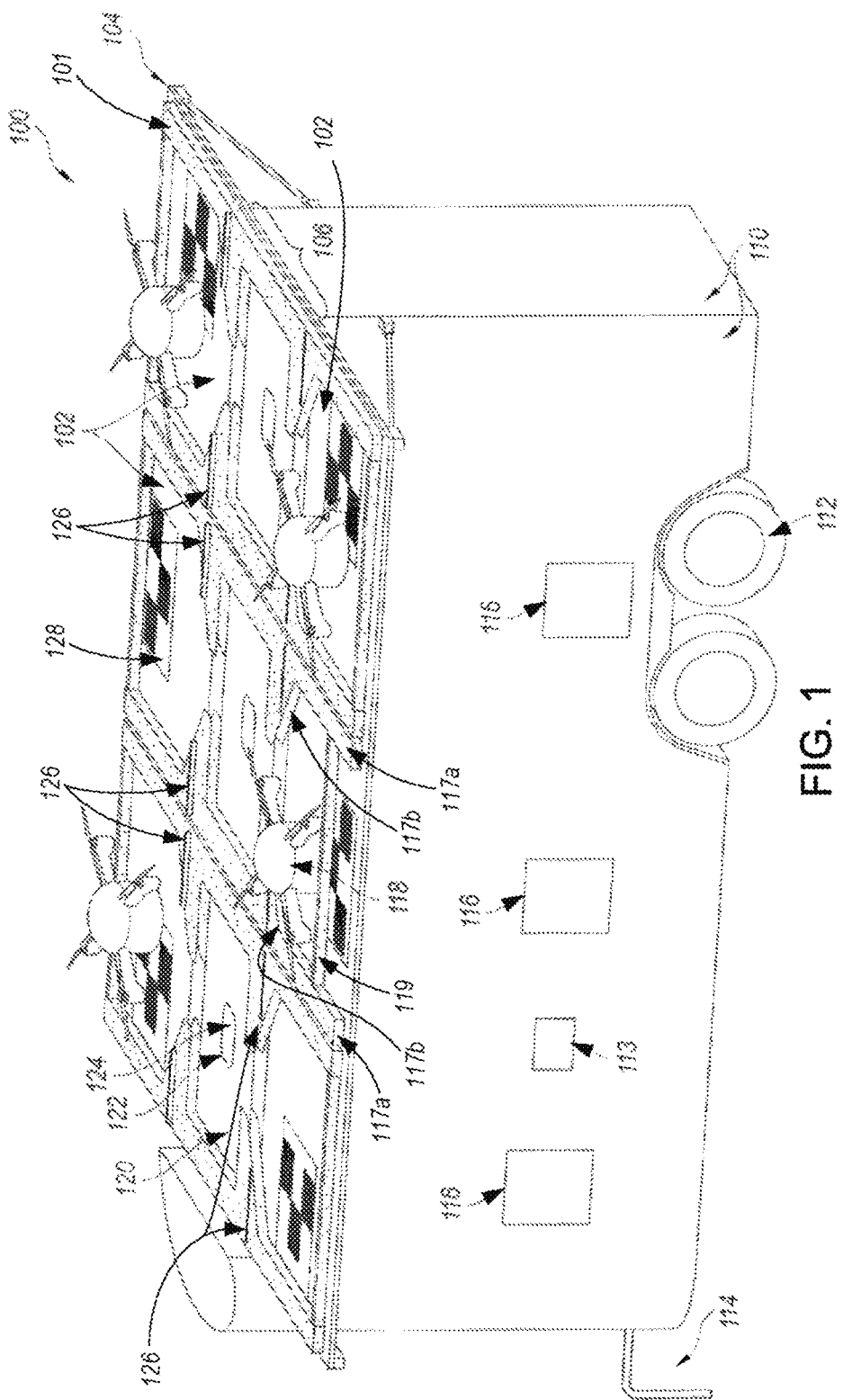
FIG. 1 shows an exemplary UAV facility.

FIG. 1 shows a first example of a UAV facility 100. The facility includes a housing with a roof 104, a base, and multiple side surfaces 110 located between the roof and the base to enclose the housing. In some embodiments, the housing may include wheels 112 to transport the housing, a jack 114 to level the housing, and a receptacle to attach to a vehicle. In embodiments, the UAV facility 100 is modular and transportable, e.g., permitting the UAV facility 100 to be located and re-located at various different locations and customer premises. In embodiments, the UAV facility 100 is communicably connected with one or more remote computing systems. For example, the UAV facility 100 may communicate with one or more remote servers and/or remote operators to transmit information about flight data, maintenance, security, etc.

The roof 104 includes a center section 106 that extends lengthwise along a center of the roof. The center section 106 includes multiple openings so that each opening accommodates a drone delivery platform such as an elevator platform 120. The multiple openings of the center section 106 are located in a row in the center section 106. The elevator platforms 120 may be located lengthwise along the center of the roof. The elevator platforms 120 are moved up to the center section 106 and are moved down into the housing. Movement may be controlled by a drive system, for example. When the elevators platforms are in an up position, the top of the elevator platforms are level with the top of the center section. Additionally, when the elevator platforms are in a down position, the elevator platforms may be programmed to stop at some height above the base of the housing. The elevators may stop at some height above the base to allow a drone located on the elevator to lower a cable including an attachment, such as a locking mechanism, coupling mechanism or a dongle, to attach to a payload that is located below the elevator. Thus, each elevator platform may be moved down into the housing to a predetermined height above the base.

Each elevator platform 120 includes a hole or aperture 122 that may be located in the center of the elevator platform. Each hole 122 may be sized to receive a payload through the hole to attach to a drone cable's attachment. Each hole 122 is covered by a panel 124 that can be opened. One benefit of the panel 124 is that can protect the various components inside the housing from dirt, debris, or rain. At least one elevator platform 120 is coupled to one or more vertical bars located inside the housing. The one or more vertical bars allow the at least one elevator platform to move up to each opening in the center section and to move down inside the housing.

The roof 104 also includes multiple landing surfaces 102 or landing ports located adjacent to the center section 106. The landing surfaces 102 allow a drone 118 to land on each landing surface. The dimensions of the landing surfaces 102 allow a drone to land without crashing into another drone. For example, the length and width of each landing surface is greater than a diameter of the drone including its propellers. In an exemplary embodiment, the top of each landing surface or landing port may include different landing patterns 128. Each drone can be programmed to recognize a different landing pattern so that a drone can land on a landing surface corresponding to or assigned to that drone.

The exemplary housing may be designed in various modular configurations so that the UAV facility stores, processes and deploys multiple drones or a single drone. In some embodiments, the UAV facility may include one landing surface located adjacent to the center section and structured to allow a drone to land on the one landing surface. For example, the center section may include one opening corresponding to one elevator platform and one landing surface for one drone. In yet another exemplary embodiment, the landing surfaces may be located on one side of the center section. For example, three landing surfaces with three drones may be located on one side of the center section. In some embodiments, the landing surfaces may be located on three sides of the center section. For example, one landing surface with a drone may be located to the top of the center section, a second landing surface with a drone may be located on one side of the center section, and a third landing surface with another drone may be located to the bottom of the center section.

In some embodiments, the multiple drones 118 located on the roof 104 may be temporarily stored within the housing. One benefit of such an embodiment is that it may allow for secure store of the drones, for example, during bad weather.

FIG. 1 also shows an exemplary drone/UAV positioning system/mechanism 101. A drone positioning mechanism 101 is located on top of the roof 104 to allow a portion of the drone 118 to be properly positioned above a hole 122 of an elevator platform 120 when the drone is moved from its landing surface to an adjacent elevator platform. The drone positioning mechanism 101 may include at least two rail guides 117a located on opposite ends of each landing surface. Each of the two or more rail guides 117a extends towards the center section. At least one bar 119 located at a distal end or the far end of each landing surface. The bar 119 is configured to move laterally along at least two rail guides 117a to push or move each drone 118 from its landing surface 102 to at least one of the elevator platforms 120 located adjacent to the landing surface. In some embodiments, the at least one bar 119 is moved with linear actuators, electrically driven and positioned by software and various sensors.

Each rail guide 117a extends towards the center section of the roof. In some embodiments, each rail guide 117a may include a proximal end 117b that is curved inwards so that the curved sections of the two or more rail guides create a funnel-type shape. When a bar 119 moves the drone from its landing surface to its corresponding elevator platform 120, the curved sections guide the drone 118 to be positioned on top of its corresponding elevator platform 120. One benefit of the inward curved rail guides is that it corrects or guides the positioning of the drone so that a payload housing of the drone is aligned on top of the hole 122 of the elevator platform 120 to receive a payload. In some embodiments, the alignment of the drone may also include moving or rotating the rail guides.

In some embodiments, the drone positioning mechanism 101 may also include hinges 126 located on top of each rail guide to allow the plurality of landing surfaces 102 to be folded on top of the center section 106. The hinges 126 are located in between the center section 106 and each landing surface 102. A benefit of foldable landing surfaces is that it can reduce the width of the housing so that the housing can be easily transported from one place to another, and the housing can be easily stored in a garage.

FIG. 1 also shows multiple ingress ports 116 located on at least one of the side surfaces 110 of the housing. The ingress ports are structured to receive a payload. In some embodiments, each ingress port includes a door that opens to allow a user to place a payload in a holding tray that may be located behind the door and/or that may be operative to movably relocate the payload inside or outside of the housing. One of ordinary skill in the art will recognize that a holding tray refers to a receptacle, fixture, or assembly, or other similar mechanical or electro-mechanical apparatus, for receiving and securing the payload for ingress into the housing. Holding trays may vary in size, material(s), and configuration.

Each ingress port may also include a scanner to scan, for example, a barcode or a quick response (QR) code on a payload. A benefit of scanning the payload is that the UAV facility matches the payload with a delivery event, location, or process. For example, when a drone operator receives a request from drone customer, such as a pizza store, to deliver a box of pizza to an end customer, the pizza store operator may generate and send to the drone operator a printable scannable code that includes delivery related information. The printable scannable code can allow the operator to program the drone for the delivery route. The code, such as a barcode or a QR code, may include delivery related information such as the destination of the delivery and information about the payload, such as the contents and an approximate weight of the payload. Alternatively, the code may simply include an order number that is used by the UAV facility to determine delivery related information. When a pizza store employee selects a drone and delivers the box of pizza with the affixed code to the UAV facility, a scanner scans the code to determine delivery related information for the selected drone. The information about the selected drone and the delivery related information are sent to the drone operator to confirm the address and that the payload was loaded onto the correct drone. Subsequently, a drone operator sends the drone to deliver the payload to the end customer's destination. In some embodiments, the delivery related information generated by the drone operator may be used by the UAV facility to confirm size or weight or other physical characteristics of the payload.

Another benefit of scanning the payload is that it may facilitate third-party tracking of the payload. For example, a time stamp generated by the scanner or generated by the computer communicably connected to the scanner allows the computer to track delivery duration and time of arrival of the payload to its final destination. A third party can use his or her mobile device or computer to track the status of the payload during the delivery process. The delivery status may include information such as awaiting payload from the store, processing payload at the UAV facility, or deployed payload by the UAV facility.

In some embodiments, each ingress port 116 may be located below each landing surface 102 so that a user can select a drone and place a payload in the ingress port corresponding to the drone. The location of an ingress port 116 below a landing surface 102 simplifies the design of the holding trays and the tracks that are used to deliver the payload from the ingress port to a location inside the housing where the payload is attached to a cable of the drone. In some embodiments, a single ingress port located on at least one of the side surfaces of the housing may also be used for delivering payloads to multiple drones. For instance, a plurality of tracks may be designed to allow a payload to be picked up from one ingress port and delivered to a location below any of the selected drones so that a payload can be attached to a cable of a selected drone. In some embodiments, each ingress port may be located across from at least one other ingress port. The location of an ingress port across from another ingress port also simplifies the design of the holding trays and the tracks that are used to deliver the payload from the ingress port to a location inside the housing where the payload is attached to a cable of the drone. In some embodiments, an elevator platform is shared by two drones located across from each other. Thus, if multiple users simultaneously select two drones located across from each other to deliver two separate payloads, the UAV facility is configured to serially process each of the two drones so that one payload is attached to one drone at a time.

In some embodiments, the system may assign a priority level to each delivery. In such an embodiment, if multiple users simultaneously select two drones located across from each other to deliver two separate payloads, the UAV facility processes the payloads based on the priority level. For example, the UAV facility is provided with the priority level information for each payload so that the UAV facility first processes the payload with a higher priority level. Nominal priorities can be sorted by first-come-first served, or by an expected time-to-deliver, or by a function of distance. Priority level may be related to whether an end-customer is a private person or a business entity so that previously established business rules for a person or business entity may be followed for processing of the payload. In some embodiments, priority level may be automatically set to urgent delivery for certain time-sensitive payloads, such as medical supplies or meal deliveries. Priority levels may also relate to a user selected option for a shorter delivery time.

In some embodiments, an external and/or extendable power cord (not shown) is removably or permanently connected to the UAV facility 100. In an embodiment, a power cord originating within the UAV facility 100 may be plugged into an outlet within or outside of a store 808. In an embodiment, the UAV facility 100 derives power from power cord connected to the outlet in order to recharge batteries and power the mechanical- and electrical-systems of the UAV facility 100. In an embodiment, an extendable power cord is provided on the facility 100 which is plugged into a mains power outlet on the awning of a customer store (thus safely moving the power cord away from pedestrians and other objects), or into an outlet on the ground.

In embodiments, the UAV facility 100 is powered by a generator, such as a modular generator, by internal batteries, and/or by solar charging. In an embodiment, the batteries powering the UAV facility 100 may comprise one or more fully- or partially-charged batteries awaiting deployment on a drone. In another embodiment, the batteries powering the UAV facility 100 may comprise batteries not intended for deployment on a drone, and for which such batteries may be charged and/or recharged within the UAV facility 100, at the store 808, and/or at an off-site location.

Figure 2:
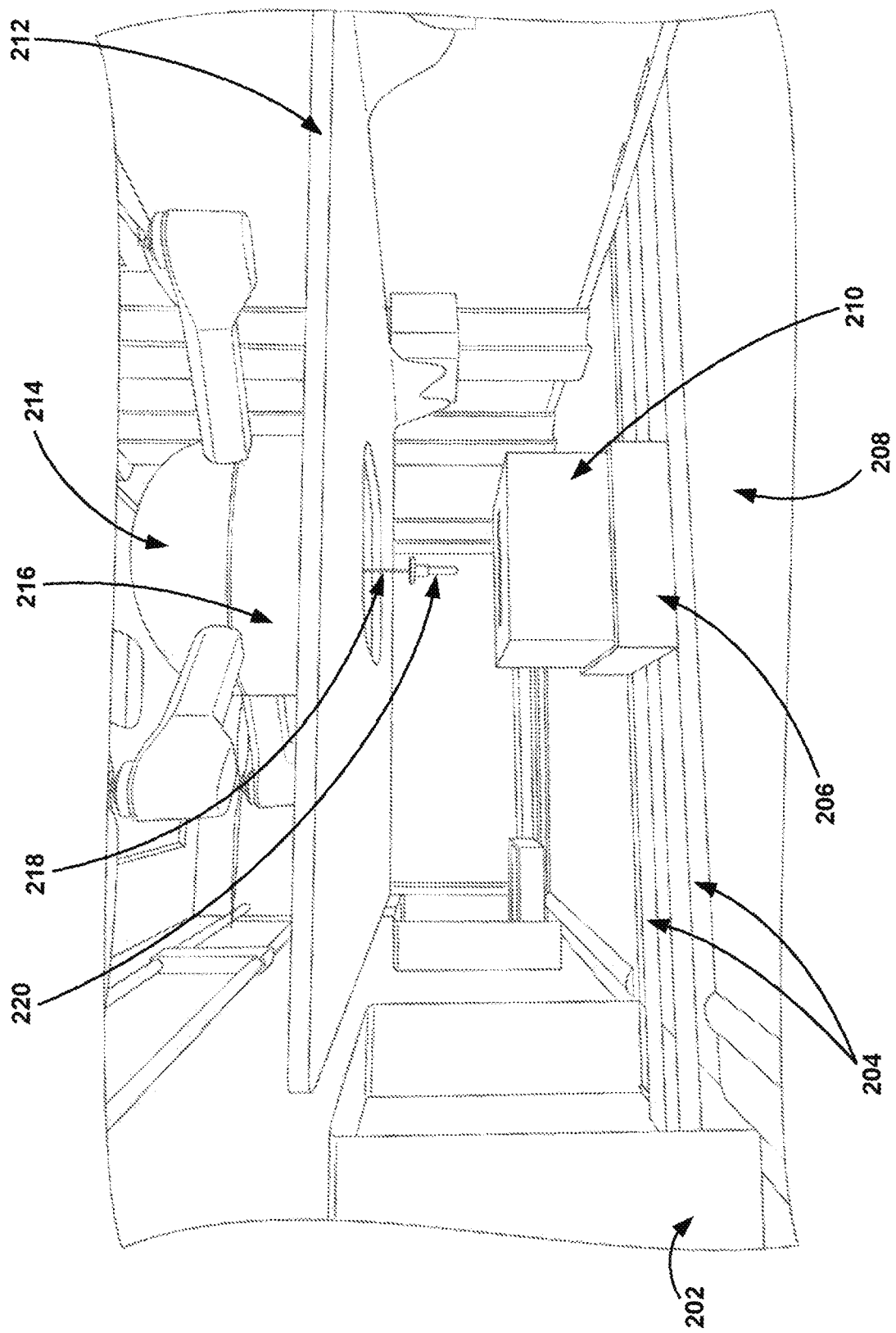
FIG. 2 shows exemplary tracks and holding trays of the UAV facility to allow the drone to attach to a package.

FIG. 2 shows exemplary tracks, also known as guide rails, 204 and holding trays 206 located inside of the housing to allow a drone 214 to receive a payload 210. One or more tracks 204 located above the base of the housing are used to move the payload 210 to a location below the elevator platform 212. In some embodiments, each track is coupled to one or more movable holding trays 206. The holding trays 206 are moved along the tracks from the ingress port 202 to a location 208 below the elevator platform 212. When the holding tray 206 with the payload 210 is positioned below the hole of the elevator platform 212, the drone lowers its cable 218 with an attachment 220 to attach to the payload 210. The attachment 220 may include a locking mechanism or a dongle. When the payload 210 is attached to the attachment 220, the drone retracts the cable 218 with the attached payload 210. The retraction of the cable raises the payload into the drone's payload housing 216. Once the payload is received by the drone, the holding trays 206 may be moved back to the ingress port 202.

In some embodiments, each track may run between two ingress ports located across from each other. The sharing of tracks between ingress ports simplifies the mechanical and electrical design for moving one or more holding trays from an ingress port to a location below the elevator platform. In some embodiments, two ingress ports located across from each other may share one holding tray.

FIG. 1 shows an exemplary user interface on the housing. A user may use a user interface 113 to initiate the drone selection and processing steps as further described in FIG. 4. In some embodiments, a user interface 113, such as a touchscreen user interface, may be located on the side of a housing 110 or next to one of the ingress ports 116. In an exemplary embodiment, multiple user interfaces may be installed on the side of the housing next to each ingress port so that multiple users can drop off payloads with the UAV facility at the same time.

Figure 3A:
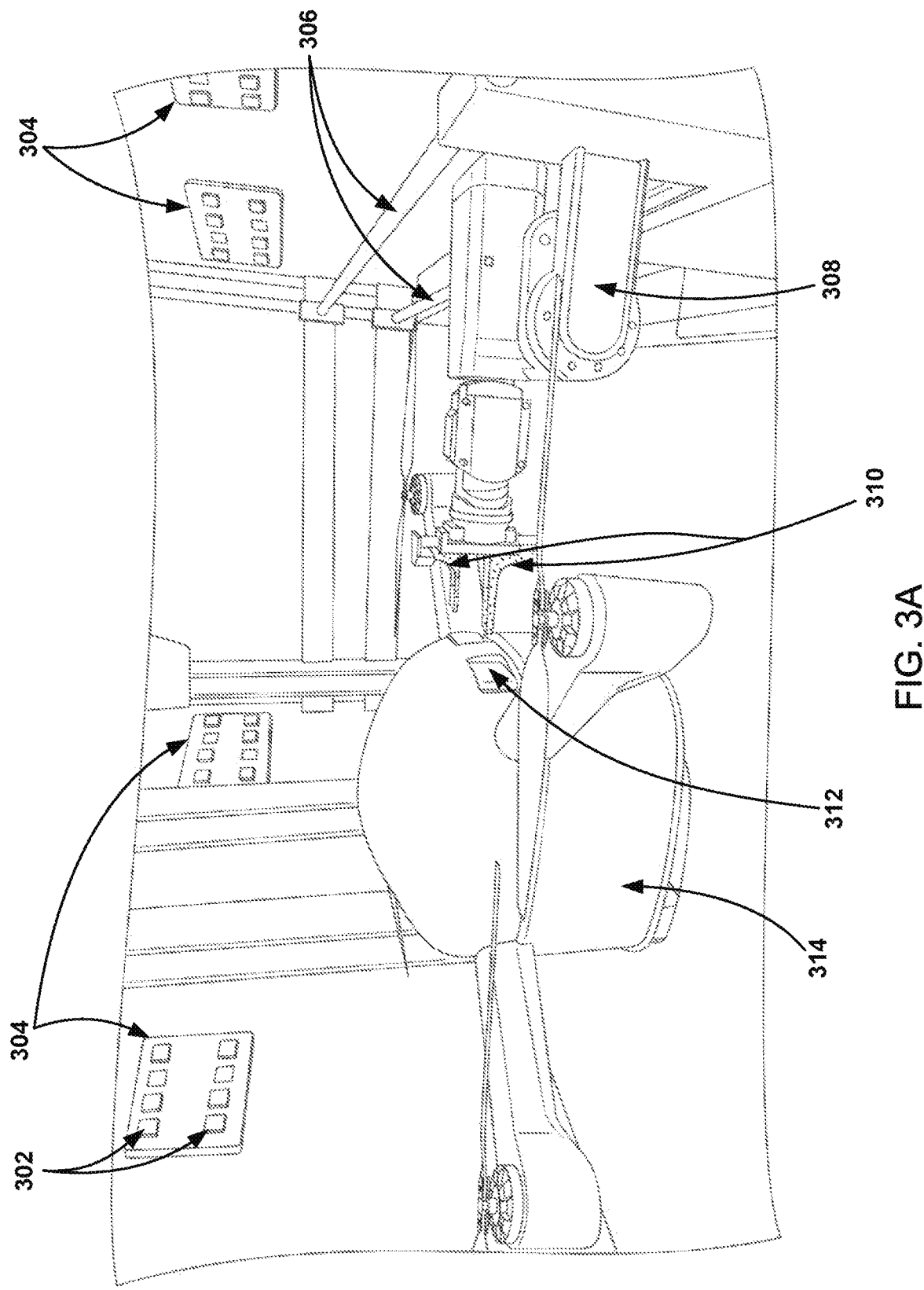
FIG. 3A shows exemplary battery charging bays and a robotic arm of the UAV facility.

FIG. 3A shows the exemplary battery charging bays 304 and robotic arm 308. The UAV facility may include multiple battery charging bays 304 mounted inside the housing, or in one of the embodiments, mounted on one or more of the surfaces of the housing or otherwise within the housing. A battery charging bay 304 is configured to charge a plurality of batteries 302 used by the drones. In some embodiments, a battery charging bay 304 may determine characteristics of a battery 302 by assessing or measuring battery status, or alternatively receiving information reported by the battery regarding its health status. For example, the battery charging bay may determine a health status of the battery, including the number of charge cycles for a battery, the rate at which a battery is charged, remaining charge, discharge rates, and other battery usage measures. Regarding battery usage, the battery charging bay may further determine whether a battery depleted its charge at a higher or lower rate than was expected, or in some other way than was expected. For instance, a battery charging bay may determine if a fully charged battery in a drone used, for example, 50% of its charge for a delivery that should have only taken, for example, 20% of the battery's charge. Based on the battery usage information, the battery charging bay may recommend that a poorly performing battery be replaced with a new battery.

Figure 3B:
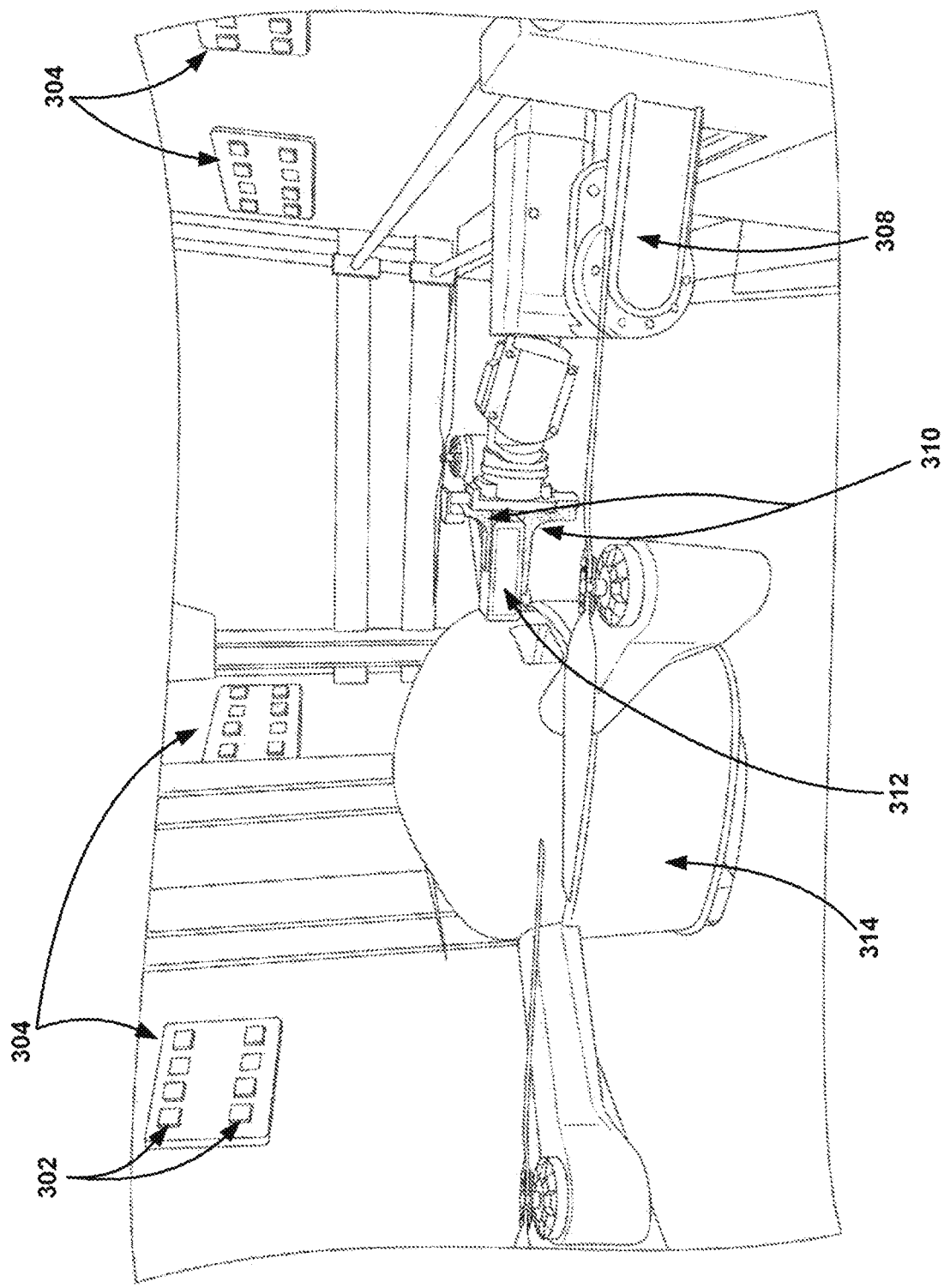
FIG. 3B shows exemplary battery charging bays and a robotic arm holding a battery removed from a drone.

FIG. 3A also shows an exemplary robotic arm 308. In some embodiments, a robotic arm 308 is movably coupled to one or more holding rails 306 (e.g., two are shown in FIGS. 3A and 3B inside the housing. The exemplary robotic arm 308 is programmed to remove a battery 312 from a drone 314 and replace it with another battery 302 from the battery charging bay 304. FIG. 3B shows an exemplary robotic arm 308 with a battery 312 removed from a drone 314. The robotic arm 308 is configured to move to a location next to one of the battery charging bays 304 and insert the battery 312, e.g., for recharging, into the battery charging bay. The robotic arm 308 is also configured to remove a battery from a battery charging bay 304 and insert the battery, e.g., a fully-charged battery, into the drone 314. In some embodiments, when the drone is lowered into the housing, the robotic arm 308 uses its grippers 310, such as two prongs, to remove a used battery 312 from a side of the drone 314. The robotic arm 308 moves to a location next to one of the battery charging bays 304 and then inserts the used battery 312 into the battery charging bay 304. Next, in an embodiment, the robotic arm's grippers removes a charged battery from the battery charging bay, moves to a location next to the drone and then inserts the charged battery into the drone. In an exemplary embodiment, the robotic arm 308 is a three-axis robotic arm. A benefit of a three-axis robotic arm is that it can be maneuvered in a relatively confined space, for example, when a drone is located inside the housing. In embodiments, computer software and/or firmware execute instructions for controlling the movements of the robotic arm, including the movements of the robotic arm on the two holding rails 306.

Figure 4:
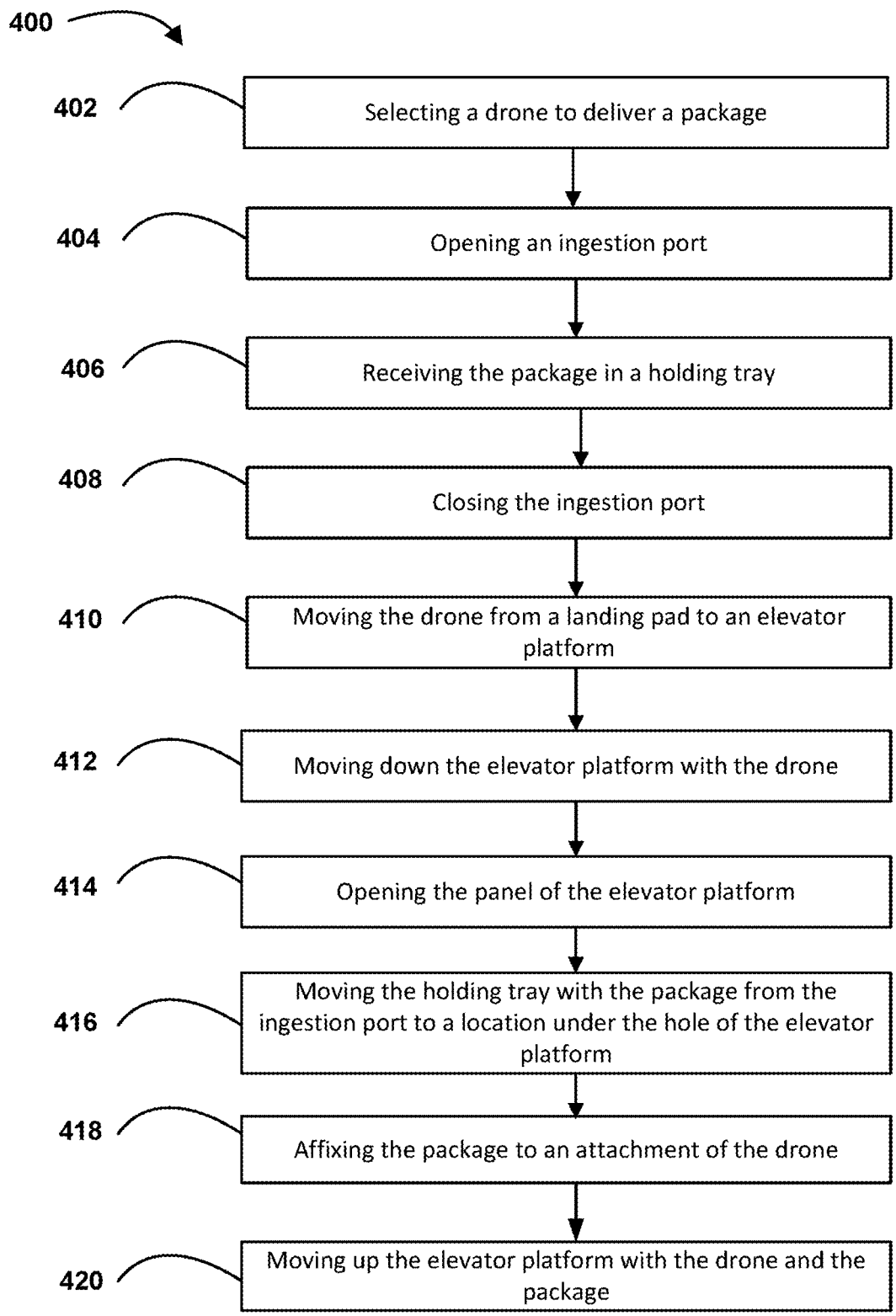
FIG. 4 shows an exemplary flowchart for processing packages for delivery.

FIG. 4 shows an exemplary flowchart 400 for processing payloads for delivery. At Step 402, a drone located on or in a housing is selected to deliver a payload. In some embodiments, a user interface may be provided on a display connected to the housing for selecting and processing of one or more drones for delivery. For example, a user interface may be configured to display the availability of the drones for delivery so that when one of the drones is out for delivery the user interface may disable functionality and/or access associated with that drone. A user may also interact with a user interface, such as a touch screen display, to select a particular drone for delivery. In Step 404, an ingress port associated with the selected drone opens. In some embodiments, an ingress port door opens in response to the user's selection. In Step 406, the user places a payload in a holding tray. In an embodiment, the holding tray is located adjacent to the ingress port. In Step 408, the ingress port is closed. In some embodiments, the ingress port is closed using the door corresponding to that ingress port. In some embodiments, a user may press a button on the user interface to close the ingress port door. In some embodiments, a single ingress port and corresponding door may be configured to receive payloads for multiple drones. For example, a single track may be coupled to a movable holding tray. In an embodiment, the holding tray can move along the track from the single ingress port to a location below one or more multiple elevator platforms. When a holding tray is below an elevator platform associated with a drone selected for delivery, the payload can be received by a selected drone.

In an exemplary embodiment, after a payload is received by a holding tray, a scanner inside the housing scans labeling on the payload to obtain delivery related information about the payload. In another embodiment, other payload characteristics (e.g., shape, weight, etc.) may be assessed to link the particular payload with the drone that will deliver the payload. A benefit of scanning the payload is that the UAV facility matches the payload with a delivery event, location, or process as described above. Another benefit of scanning the payload is to facilitate third-party tracking of the payload.

In Step 410, the selected drone is moved from its landing port to an elevator platform. In some embodiments, the drone positioning system is used to move the drone to the elevator platform. For example, a bar located on top of the housing moves the drone from its landing port to its corresponding elevator platform. In some embodiments, the elevator platform includes a hole covered by a panel.

In Step 412, the elevator platform with the drone is moved down into the housing for further processing. In Step 414, the panel covering the hole in the elevator platform is opened so that a bottom portion of the drone is accessed, for example, through a hole. As explained in Steps 416 and 418, the opening of the panel also allows an attachment of the drone to access the payload in the holding tray moved to a location below the hole of the elevator platform. In some embodiments, the panel covering the hole is opened when the elevator platform with the drone is moved down into the housing.

In Step 416, the holding tray with the payload is moved from the ingress port to a location below the hole of the elevator platform. In some embodiments, to save processing time, the holding tray with the payload may be moved into position below the elevator when the elevator platform with the drone is lowered into the housing. In Step 418, the payload is affixed to an attachment of a cable lowered from a drone. In some embodiments, when the holding tray is moved to a position below the elevator platform carrying the drone, the drone lowers its cable with an attachment so that the attachment can attach to the payload. When the attachment is affixed to the payload, the drone retracts the cable with the attached payload so that the payload is raised up to and/or tensioned to the drone. In an embodiment, the payload may be locked or otherwise secured in place to the drone.

In some embodiments, the payload may move under the elevator platform before the drone is lowered into the housing or before the robotic arm swaps the drone's battery. In some embodiments, the drone lowers its cable with the attachment to affix to the payload after the robotic arm has replaced the drone's used battery with a freshly charged battery. In an exemplary embodiment, after a drone is lowered into the housing, the drone's battery is replaced with a charged battery from the battery charging bay. A robotic arm moves along one or more holding rails inside the housing, removes a used battery from a drone, and replaces it with a freshly charged battery from the battery charging bay. In some embodiments, the battery charging bay scans each battery to determine battery characteristics, such as the battery status, the type of battery, the manufacturer, the number of charge cycles, charge used per delivery, the rate of charging each battery, etc.

In some embodiments, after the payload is affixed to the attachment of the cable and the cable is retracted by the drone, the UAV facility may send a message to a drone operator and/or computer confirming that the payload has been received by the drone. In some embodiments, the UAV facility may alert the drone operator and/or computer regarding any non-conformity events. In some embodiments, the UAV facility's user interface may be used to alert an operator of any non-conformity event(s), such as an absence of battery before or after the payload is attached to the drone, absence of drone for delivery, postponing the delivery event, cancelling the delivery event, unexpected delivery events such as weather conditions that may not be suitable for flying drones, improper attachment of a payload to the drone, weight in excess of flight parameters, etc. In Step 420, the elevator platform with the drone and the payload is moved up to the roof. In some embodiments, a panel of the elevator platform is closed when the elevator platform moves up to the roof. After the drone is processed, the drone is sent to a destination to deliver the payload.

Figure 7:
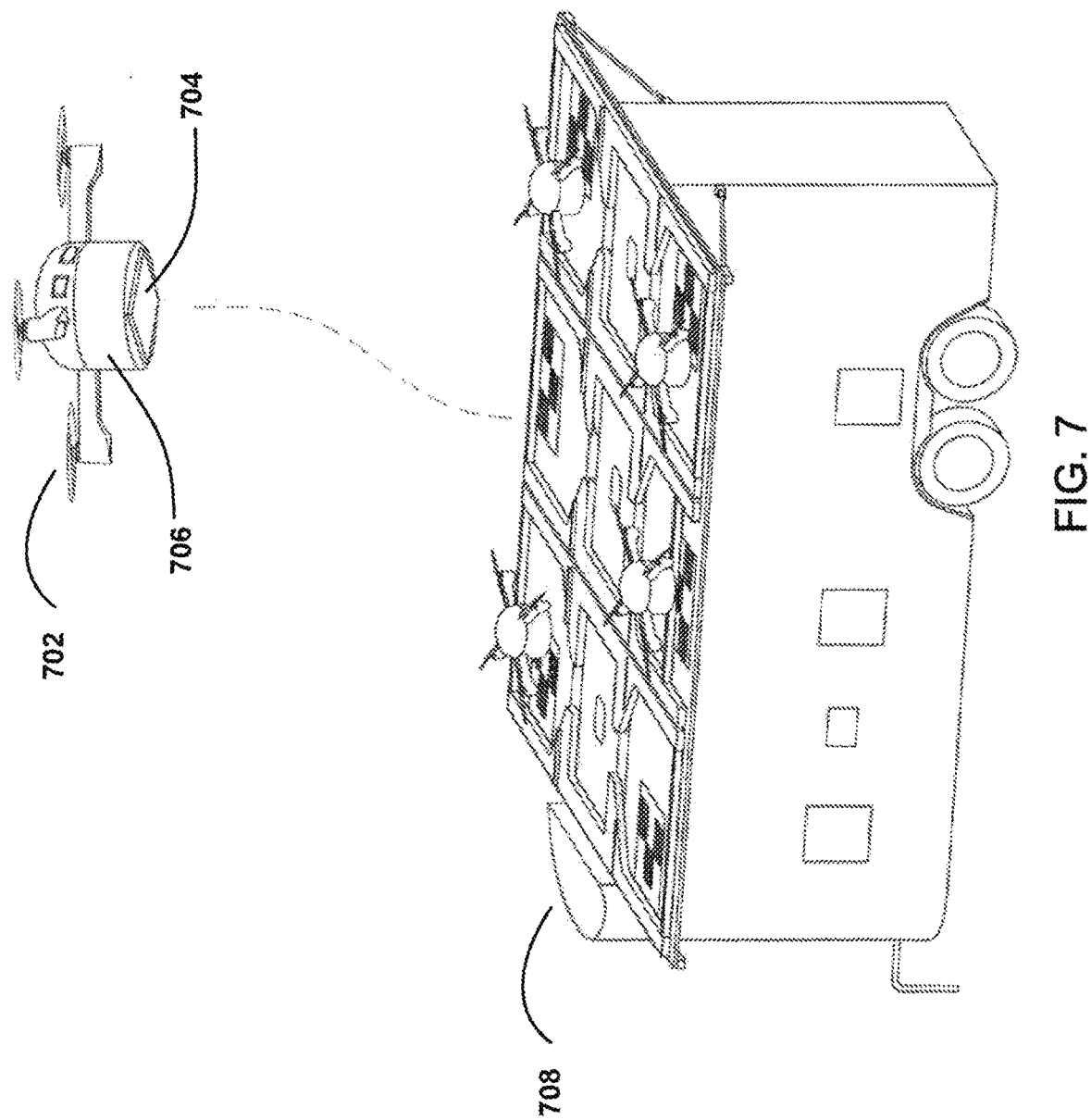
FIG. 7 shows a drone deployed from a UAV facility to deliver a package to a destination.

FIG. 7 shows an exemplary drone 702 deployed from the UAV facility 708 to deliver a payload 704 to a destination. The payload 704 is affixed to an attachment of a cable (not shown) retracted by the drone. In some embodiments, when the payload 704 is fully retracted by the drone, the payload is received into a payload housing 706 of the drone 702. The payload housing 706 includes an opening that allows the drone to retract the payload 704 into the payload housing. In some embodiments, the payload housing 706 surrounds the payload 704 and forms an enclosure around the payload. A benefit of the payload housing is that it protects the payload 704 and the drone 702 from excessive movement (i.e., sway) due to wind gusts.

Figure 5:
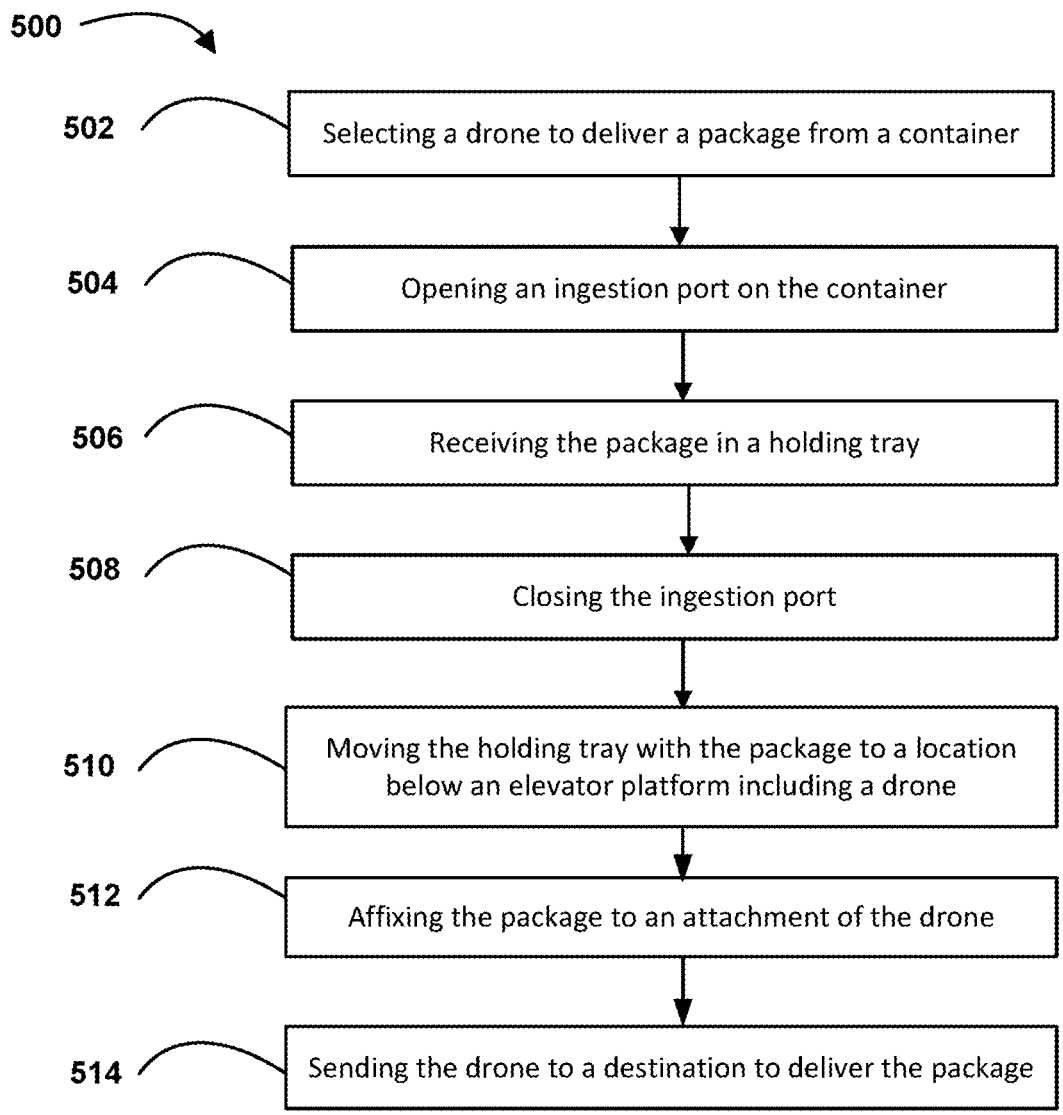
FIG. 5 shows another exemplary flowchart for processing packages for delivery.

FIG. 5 shows another exemplary flowchart 500 for processing payloads for drone delivery. In Step 502, a drone is selected to deliver a payload from a housing. In Step 504, the ingress port on the housing is opened. In Step 506, the payload is received in a holding tray. In Step 508, the ingress port is closed. In Step 510, the holding tray with the payload is moved to a location below an elevator platform that includes the drone. In Step 512, the payload is affixed to an attachment of the drone. In Step 514, the drone is sent to a destination to deliver the payload.

Figure 6:
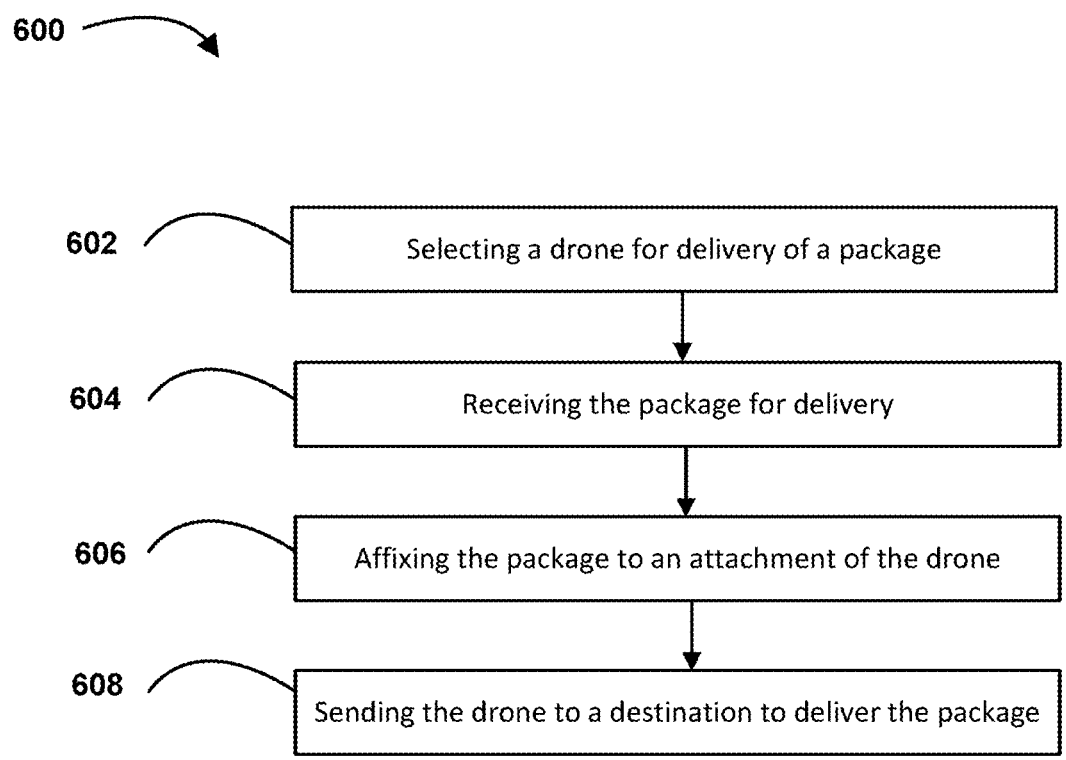
FIG. 6 shows another exemplary flowchart for processing packages for delivery.

FIG. 6 shows yet another exemplary flowchart 600 for processing payloads. In Step 602, a drone is selected for delivery of a payload. In Step 604, the payload is received for delivery. In Step 606, the payload is affixed to an attachment of a drone. In Step 608, the drone is sent to a destination to deliver the payload.

Figure 8:
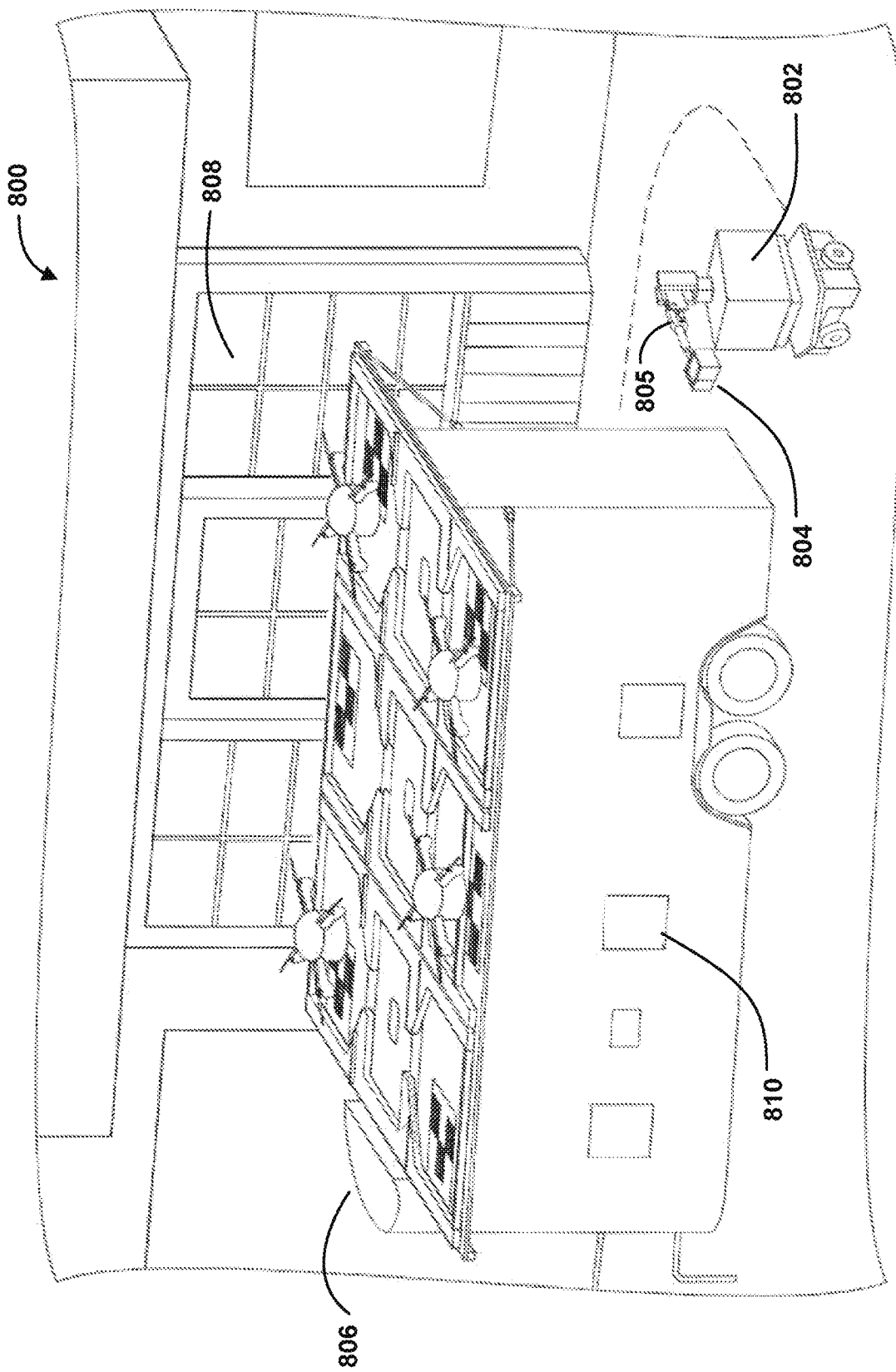
FIG. 8 shows an exemplary robot transfer system to deliver packages from a store to a UAV facility.

FIG. 8 shows an exemplary robot transfer system 800 that includes a robot 802 that delivers payloads 804 comprising merchandise from a store 808 to the UAV facility 806. In some embodiments, the robot 802 is a ground robot that includes wheels or continuous tracks to allow the robot 802 to move between the store and the UAV facility 806. The robot 802 can be docked in a robot docking station in a store (not shown). The docking station may allow the robot to charge the robot's battery. When an order is received, a store employee fills a payload with the ordered merchandise and provides the payload to the robot. In embodiments, the payload is loaded on a robotic arm 805 of the robot 802. One of ordinary skill in the art will recognize that the payload may be loaded, connected, or affixed to the robot in various ways. When the robot receives the payload, the robot may proceed along a preprogram med route (shown as dotted lines in FIG. 8 from a robot docking station in the store 808 to the UAV facility 806.

In embodiments, the robot may include a sensor or a suite of sensors used for a collision avoidance system. For example, a collision-avoidance system may include sensors, such as proximity sensors or LiDAR, to determine customers or objects that are near the robot. Based on the proximity information received by the robot, the robot may deviate from the pre-programmed route to avoid hitting a customer or an object. In an embodiment, the robot returns from delivering a payload via its pre-programmed route. In another embodiment, the robot navigates its route(s) using sensors to determine that certain objects are located at a safe distance from the robot.

In FIG. 8, the robot 802 is shown as moving along a pre-programmed route (shown as dotted lines in FIG. 8 from the robot docking station in the store 808 to the UAV facility 806. The robot 802 stops under or next to an ingress port 810 of the UAV facility 806 and raises the payload 804 next to the door of the ingress port 810. In embodiments, the robot 802 may navigate up, down, and/or around stairs or other obstacles. In some embodiments, the robot 802 may wirelessly communicate with the UAV facility 806 to open the door associated with an ingress port. In some other embodiments, the robot 802 may communicate with the UAV facility 806 utilizing a wired or some combination of wired and/or wireless interfaces to open the door associated with an ingress port.

In some embodiments, the payload is delivered by the robot 802 to the UAV facility 806 using the robot's robotic arm 805. In some other embodiments, the UAV facility 806 includes a robotic transfer arm that attaches to the payload on the robot 802 and that moves the payload from the robot 802 to the drone loading platform, for example, the holding tray associated with the ingress port. Once the payload is received by the UAV facility, the payload is processed for delivery by a drone as described in FIGS. 1-7. Subsequently, the robot 802 returns to the store 808 and docks in the docking station where the robot's battery is charged.

Figure 9:
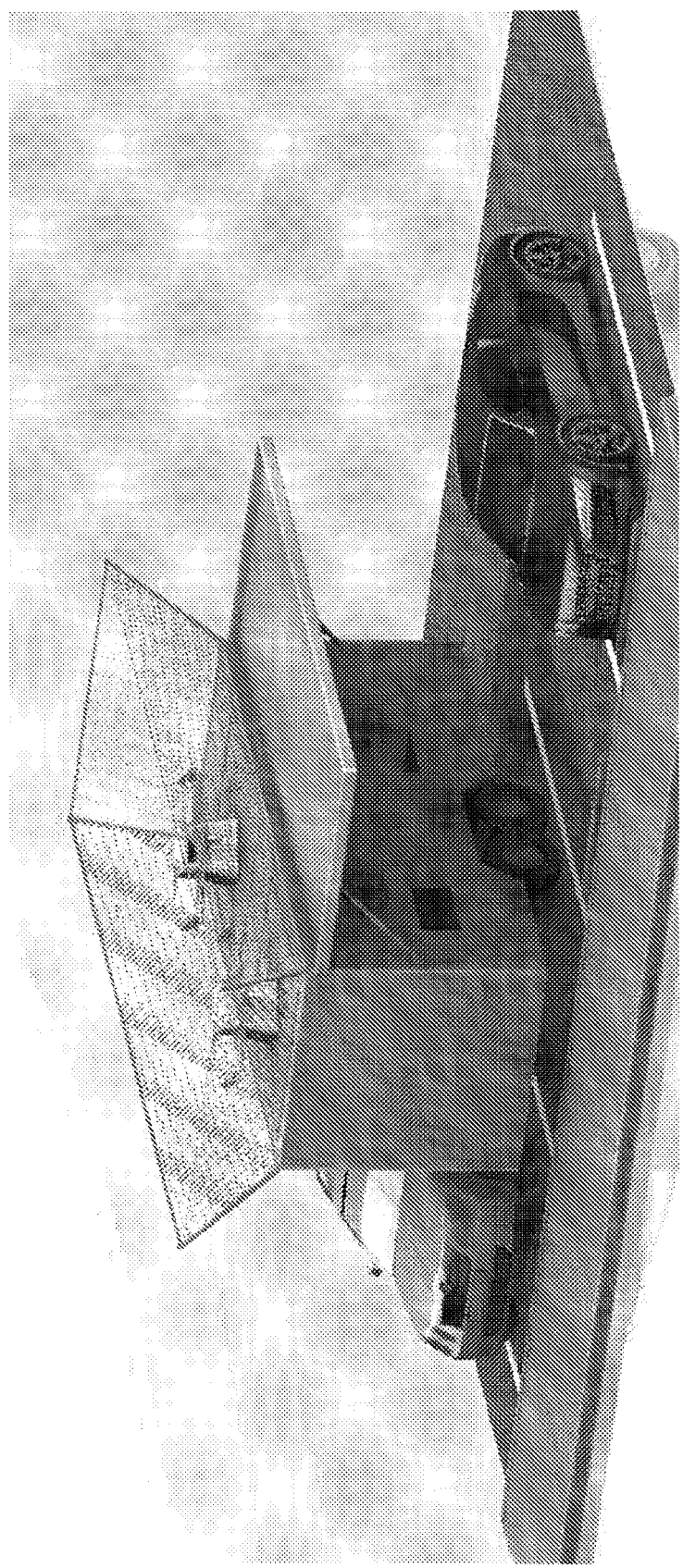
FIG. 9 shows an exemplary drone delivery system comprising a safety barrier.

FIG. 9 shows an exemplary UAV facility 100 that further comprises a safety barrier. In this example, the safety barrier is comprised of rigid elements (e.g., at each corner of the safety barrier) that support a protective netting or other suitable material to reduce wind flow on and over the UAV facility 100, and to provide an additional barrier between drones and pedestrians.

Figure 10A:
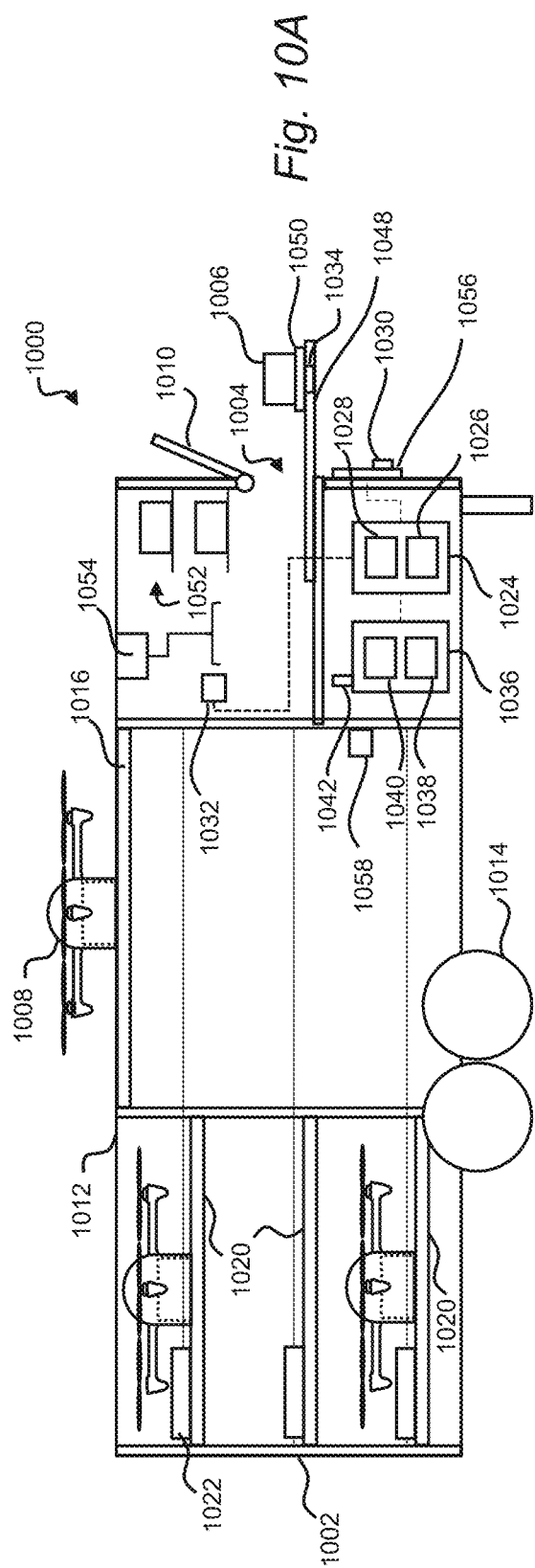
FIG. 10A is a side view of another UAV facility in accordance with an example.

FIG. 10A depicts an alternative UAV facility 1000. The facility may comprise any, none or all of the features described above in relation to FIGS. 1-9.

The facility 1000 comprises a housing 1002 having at least one ingress port 1004 to receive a payload 1006 for delivery by a UAV 1008. In this example, the ingress port 1004 can be opened and closed by moving a door 1010. The housing 1002 defines a volume within which payloads 1006, UAVs 1008, batteries, and/or other objects can be stored. A user can deposit the payload 1006 within the housing 1002 by opening the door 1010 to the ingress port 1004. Once loaded into the housing 1002, the payload 1006 may be moved to a particular location within the housing 1002 before being loaded onto a UAV 1008. From here, the UAV 1008 can deliver the payload 1006 to a recipient/customer.

The housing 1002 defines a landing surface 1012 upon which the UAV 1008 can land. The housing 1002 comprises a number of surfaces including four side surfaces, a base, and an upper surface or roof, where the upper surface forms at least part of the landing surface 1012. In this example, the housing 1002 is mounted or attached to a number of wheels 1014 to allow the facility 1000 to be transported. As mentioned previously, the facility may be towed by a vehicle, or it may be a vehicle itself.

The housing 1002 may delimit an aperture through which at least part of the UAV 1008 may pass. In one example, a moveable platform 1016 forms part of the landing surface 1012, and is therefore positionable within the aperture. In FIG. 10A the UAV 1008 has landed on the surface 1012 and is positioned upon the platform 1016. In some examples, the UAV facility comprises a UAV positioning mechanism (not shown) arranged on top of the housing 1002. A UAV positioning mechanism may move the UAV from an initial landing position to a desired position, such as on top of the moveable platform 1016.

The platform 1016 may be lowered into the housing 1002 by a drive system (not shown). The drive system may control the lowering and raising of the platform 1016. For example, a controller (not shown) may instruct or cause the platform 1016 to operate once the UAV 1008 is positioned on the platform 1016.

FIG. 10A also depicts UAV storage shelves 1020 to store a UAV when the UAV is not being used. Other UAV positioning mechanisms 1022 may move a UAV between the platform 1016 and the storage shelf 1020.

This example UAV facility 1000 comprises one or more components/features capable of determining whether a payload 1006 that has been deposited into the ingress port 1004 corresponds to a delivery order/consignment. For example, a customer may place an order with a business for an item which is part of a delivery consignment. A user, such as an employee of the business, may load a payload 1006 into the housing 1002. An identification code, associated with the payload 1006, is received and is used to obtain one or more expected characteristics associated with the delivery consignment. For example, the delivery consignment may identify one or more expected characteristics of the ordered item, such as the weight. The deposited payload 1006 is also associated with one or more physical characteristics, such as a weight. Components within the UAV facility 1002 can determine or measure these physical characteristics of the payload which can be compared with the expected characteristics. Based on this comparison it can be determined whether the payload 1006 corresponds to delivery consignment. In other words, it can be determined whether the payload 1006 corresponds to the item that was ordered by the user.

To achieve this, the example UAV facility 1000 comprises a detector system. One or more components of the detector system are configured to obtain an identification code and to analyze the received payload 1006 to determine one or more physical characteristics of the payload 1006. The identification code identifies a delivery consignment, and thus identifies one or more ordered items. The example UAV facility 1000 also comprises a payload verification system configured to determine whether the payload 1006 corresponds to the delivery consignment based upon a comparison of the one or more determined physical characteristics with one or more expected characteristics of the delivery consignment. The one or more expected characteristics can be retrieved or determined using the obtained identification code. The payload verification system is further configured to accept the payload 1006 for delivery by a UAV 1008 in the event that it is determined that the payload 1006 corresponds to the delivery consignment.

In the example of FIG. 10A, the detector system comprises a computer 1024 comprising memory 1026 and a controller 1028. The controller 1028 is configured to control operations of the detector system. The detector system of this example also comprises a device, such as a scanner 1030, which can be used to obtain an identification code from the payload 1006. The scanner 1030 is communicatively coupled to the computer 1024. A user may hold the payload 1006 in front of the scanner 1030 to allow the scanner to detect the presence of a machine-readable marker located on the payload 1006 for example. The marker can therefore indicate the identification code. The scanner 1030 transmits the obtained data to the computer 1024, where the data is processed to determine the identification code. In other examples the scanner may be located inside the housing 1002.

The detector system of this example also comprises one or more devices/sensors, such as an imaging device 1032 and/or a weight sensor 1034, which are used to analyze the received payload 1006 to determine one or more physical characteristics of the payload 1006. The devices/sensors are communicatively coupled to the computer 1024. The weight sensor 1034 may obtain weight sensor data associated with the payload 1006 and transmit the weight sensor data to the computer 1024 so that the weight of the payload can be determined. The imaging device 1032 is arranged to capture an image of the payload 1006. For example, the imaging device 1032 may image the payload 1006 as it is being moved within the housing 1002. Data captured by the imaging device may be transmitted to the computer 1024. The data can be indicative of an image of the payload 1006. From this image, or the data, at least one physical characteristic of the payload 1006 can be derived. Accordingly, the detector system comprises one or more components to determine one or more physical characteristics of the payload 1006.

In the example of FIG. 10A the payload verification system comprises a computer 1036 which is communicatively coupled to the computer 1024. The computer 1036 comprises memory 1038 and a controller 1040. The controller 1040 is configured to control operations of the payload verification system. In one example the functions of the payload verification system are performed by the computer 1024.

In the example of FIG. 10A, the computer 1036 also comprises a network interface 1042 which transmits data to, and receives data from, one or more remote servers (not shown). The network interface may be wired or wireless for example, and can facilitate connection to a wide area network, such as the Internet. A remote server may, for example, be owned by, be operated by, or store data associated with the business responsible for delivering the payload 1006. Using the network interface 1042, the payload verification system obtains the one or more expected characteristics of the delivery consignment, based upon the obtained identification code. For example, the computer 1036 may transmit, to the remote server, a request for the one or more expected characteristics. If the request includes the identification code, the expected characteristics can be determined by the remote server which are then transmitted back to the computer 1036. In another example, the request includes an identification of one or more items in the delivery consignment, rather than the identification code. Once the computer 1036 has obtained the one or more expected characteristics, it can compare these with the one or more physical characteristics that were measured by the detector system. The comparison is used to determine whether the payload 1006 corresponds to the delivery consignment.

In some examples the expected characteristics are a single value, and the comparison performed by the controller 1040 may assess whether the determined physical characteristics are within an acceptable range of the value. For example, the controller 1040 may determine that a physical characteristic is substantially the same as an expected characteristic if it differs by a small amount, such as by 10%, or 5%. In other examples expected characteristics are given as a range of values and the comparison performed by the controller 1040 may assess whether the determined physical characteristics fall within this range.

In the above described example, the computer 1036 obtains the expected characteristics from the remote server. In another example however, the memory 1038 stores expected characteristics associated with a plurality of items in a database. Accordingly, the controller 1040 is configured to determine, based on the identification code, an item associated with the delivery consignment. For example, the identification code may identify one or more items, or the computer 1036 can transmit to the remote server a request for a list of one or more items associated with the delivery consignment. Once the controller 1040 has determined the one or more items, it is configured to retrieve, from the database, the one or more expected characteristics using data identifying the item. For example, the ordered items may be a 14-inch pizza and a drink. By accessing the database, the controller 1040 can determine one or more expected characteristics (such as weights) of these items.

In the above described examples, the computer 1036 itself obtains the expected characteristics and compares these to the determined physical characteristics. In another example, however, the comparison is performed by a remote server, and so the computer 1036 need not know the expected characteristics. Accordingly, the computer 1036 may transmit, via the network interface 1042, the identification code and the one or more determined physical characteristics to the remote server. The remote server receives this data and determines the expected characteristics using the identification code. Once determined, the remote server compares the one or more determined physical characteristics with the one or more expected characteristics. If these values match (i.e. it is determined that the payload corresponds to the delivery consignment), the remote server can send a positive indication to the computer 1036. If these do not values match (i.e. it is determined that the payload does not correspond to the delivery consignment), the remote server can send a negative indication to the computer 1036. The computer 1036 receives the indication of the result from the remote server and based on this determines whether the payload corresponds to the delivery consignment.

In the event that the payload verification system determines that the payload 1006 corresponds to the delivery consignment, it can accept the payload 1006 for delivery by a UAV 1008. For example, the payload verification system may send an instruction to other components within the UAV facility 1000 to cause the payload 1006 to be delivered by the UAV 1008. In one example, this instruction causes the drive mechanism to lower the platform 1016 and to move the payload 1006 to a position suitable for collection by the UAV 1008.

Figure 10B:
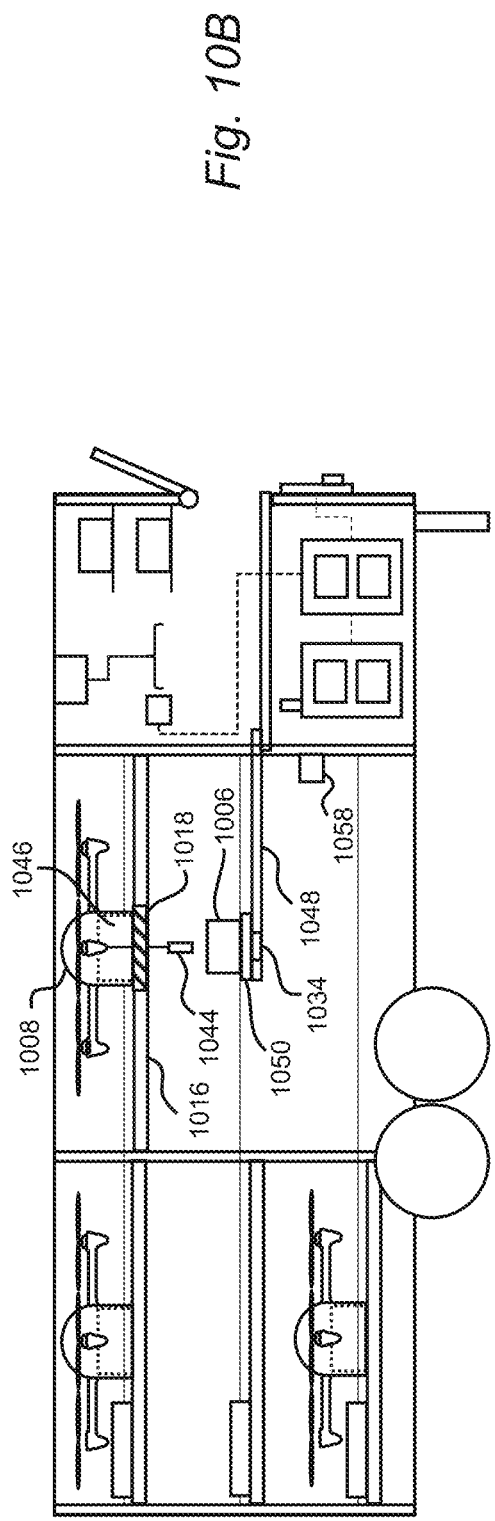
FIG. 10B is a side view of the UAV facility of FIG. 10B at a later time.

FIG. 10B shows the UAV facility of FIG. 10A at a later time, after the payload 1006 has been accepted by delivery. The platform 1016 has been lowered, which moves the UAV 1008 from a position outside of the housing 1002 to a position at least partially within the housing 1002. In addition, the payload 1006 has been moved from the initial position shown in FIG. 10A to a loading position shown in FIG. 10B.

In this example the initial position is within the vicinity of the ingress port 1006, and the loading position is below the platform 1016. The UAV 1008 comprises a retractable cable or tether and a coupling mechanism 1044 attached to a free end of the tether. The UAV 1008 can lower the coupling mechanism towards the payload 1006, to engage the payload. For example, the coupling mechanism may grab the payload 1006, or interlock with a corresponding engagement mechanism attached to the payload 1006. Example coupling mechanisms and corresponding engagement mechanisms are described in PCT application number PCT/US2018/035657, entitled "Package Delivery Mechanism" which is hereby incorporated by reference. The UAV 1008 can retract the tether and lift the payload 1006 into a payload compartment 1046. The payload 1006 can remain in this compartment 1046 during flight. To allow the tether to engage the payload, the moveable platform 1016 also delimits an aperture 1018. In FIG. 10A, the platform aperture is closed, so is not visible. FIG. 10B shows the aperture 1018 in an open configuration. The drive system may be arranged to move one or more members to open the aperture 1018. In this way, the payload 1006 can pass through the aperture 1018 during loading.

To move the payload 1006 from its initial position of FIG. 10A to the loading position of FIG. 10B, the UAV facility 1000 comprises a payload positioning mechanism. Various payload positioning mechanisms are envisaged. FIGS. 10A and 10B depict a specific payload positioning mechanism comprising a retractable arm 1048 and a tray 1050 to receive the payload, where the tray 1050 is moveably mounted along the retractable arm 1048. The retractable arm 1048 is moveable between a first, extended, position (the position in FIG. 10A and a second, retracted, position (the position in FIG. 10B. When the retractable arm 1048 is arranged in the first position, the tray 1050 is positioned to receive the payload 1006 at the initial position, and when the retractable arm 1048 is arranged in the second position the tray 1050 is positioned beneath the platform 1016. The tray 1050 slides along the length of the arm 1048 to be positioned beneath the platform 1016. In this particular example, the retractable arm 1048 extends out of the housing 1002 when it is arranged in the first position. In other examples the tray 1050 may not pass through the ingress port 1004 when the arm 1048 is arranged in the first position.

The payload positioning mechanism may be operated by the same, or a different drive mechanism used to control the operation of the platform 1016. Other payload positioning mechanisms will be described in FIGS. 11A, 11B, 12 and 13.

It may be useful to check whether the payload is correctly positioned within the tray 1050. For example, a scanner comprising one or more emitters of electromagnetic radiation and one or more detectors may determine whether the payload is correctly positioned within the tray 1050. Alternatively, one or more sensors coupled to the tray 1050 may determine whether the payload is correctly positioned within the tray 1050.

In one example, payloads received by the UAV facility 1000 are required to be packaged in a standard sized container before being delivered. The payload 1006 may already comprise an item within a container. In a specific example, the tray 1050 is shaped to receive a standard sized container. For example, the shape of the tray 1050 may match the footprint shape of the container to ensure that the position of the payload 1006 is more accurately known.

In some cases the standard container also comprises an engagement mechanism to engage the coupling mechanism 1044 of the UAV 1008. In other examples, the payload 1006 may not be packaged within a container. A packaging station (described below) may package the payload into a suitable container.

As is shown in FIGS. 10A and 10B, the weight sensor 1034 of the detector system is located beneath the tray 1050. Accordingly, the weight sensor 1034 can measure the weight of the payload 1006 once the payload 1006 is placed within the tray 1050. In other examples the weight sensor 1034 is located in another position. For example, the weight sensor may be located outside of the housing 1002 such that the user places the payload 1006 onto the weight sensor 1034 before placing the payload 1006 into the tray 1050. If the payload comprises an item in a standard sized container, the weight of the payload 1006 can be deduced by subtracting the weight of a standard sized container.

In the event that the payload verification system determines that the payload 1006 does not correspond to the delivery consignment, it can reject the payload 1006 for delivery. For example, the payload verification system may determine that one or more of the determined physical characteristics of the payload differ from the one or more expected characteristics. The payload verification system may then send an instruction to other components within the UAV facility 1000 to cause the payload 1006 to be stored in a payload storage facility 1052, or to move the payload 1006 back through the ingress port 1004.

FIGS. 10A and 10B depict an example payload storage facility 1052. As mentioned, the payloads may be stored here if they have been rejected for delivery. In other examples, the payloads may be temporarily stored here if they have been accepted for delivery, but delivery is not yet required. For example, a UAV may not be available to deliver the payload, or the payload may not need to be delivered until a later time.

The payload positioning mechanism may be configured to move a payload into the payload storage facility 1052. In FIGS. 10A and 10B the payload positioning mechanism further comprises a grabbing mechanism 1054 to lift the payload out of the tray 1052 and deposit the payload onto a shelf within the storage facility 1052. In other examples, the retractable arm 1048 is itself capable of moving the payload into a storage facility. The payload positioning mechanism is therefore configured to move the payload from the initial position to the payload storage facility to store the payload for period of time. If the payload has been accepted for delivery, it can move the payload from the payload storage facility 1052 to the loading position after the period of time has passed. If the payload has been rejected for delivery, the payload may remain within the storage facility 1052 until a user, such as an employee of the business, collects the payload.

To further improve security within the UAV facility 1000, the facility may comprise a user terminal 1056. In this example the user terminal 1056 comprises the scanner 1030, but they may be separate entities in other examples. A user can interact with the terminal 1056 to gain access to the ingress port 1004. For example, the user may enter authentication data by scanning an ID card, scanning a machine-readable marker on the payload 1006, entering a passcode into a keyboard on the user terminal 1056, or by providing biometric data such as a fingerprint. If the correct authentication data is provided, access to the ingress port 1004 may be granted. For example, the door 1010 may open to allow the user to deposit the payload 1006. Receipt of correct authentication data may also trigger the retractable arm 1048 to move into the extended position.

To ensure that the contents of the payload 1006 do not interfere with electronic components on board the UAV 1006, the detector system may further comprise an electromagnetic interference detector 1058 configured to monitor the payload by detecting whether the payload 1006 emits any electromagnetic signals which would cause electromagnetic interference. For example, the electromagnetic interference detector 1058 may determine whether the frequency, and/or strength of any emitted signals are sufficient to cause interference. If the signals are determined to be at a level sufficient to cause interference, the payload may be rejected for delivery, or may be wrapped in a package capable of attenuating the signal before being accepted for delivery.

In an example (not depicted), the electromagnetic interference detector 1058 comprises two, three or four sensors arranged at various positions around the payload. For example, there may be four sensors, where each sensor is arranged at or close to a corner of the payload. Preferably the sensors are arranged above the upper surface of the payload because this is the surface closest to the main body of the UAV during flight. The sensors can be used to build a "map" of the electromagnetic signals emitted by the payload. The electromagnetic signature of the payload can be compared to a threshold and the payload may be rejected if the threshold is exceeded.

In certain examples, the UAV facility 1000 further comprises an order receipt system configured to transmit the received identification code to a remote delivery tracking system (not shown), to indicate that the UAV facility 1000 has received the payload 1006. For example, upon receipt of the identification code, the code may be transmitted, via the network interface 1042, to the delivery tracking system. The customer who ordered the payload can access the delivery tracking system to track the location of the payload. The order receipt system may also transmit a timestamp to indicate when the payload 1006 was received at the UAV facility 100. The order receipt system may also transmit an indication of whether the payload 1006 was accepted or rejected for delivery.

Figure 11A:
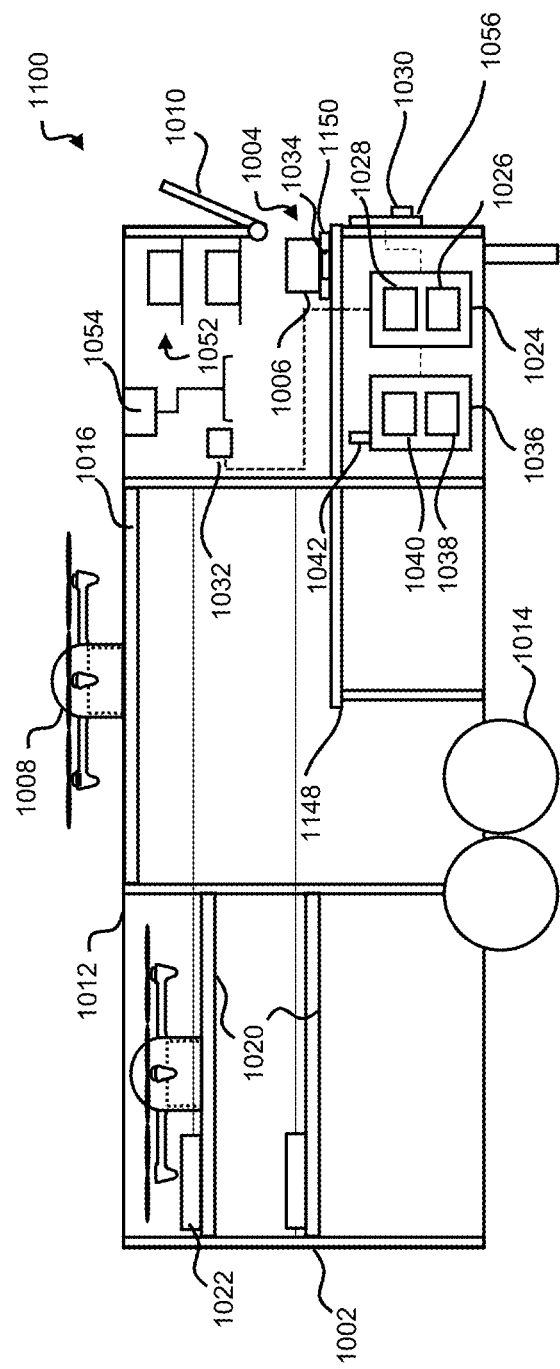
FIG. 11A is a side view of another UAV facility in accordance with an example.

FIG. 11A depicts another UAV facility 1100 which is substantially similar to that described in relation to FIGS. 10A and 10B but has a different payload positioning mechanism.

Figure 11B:
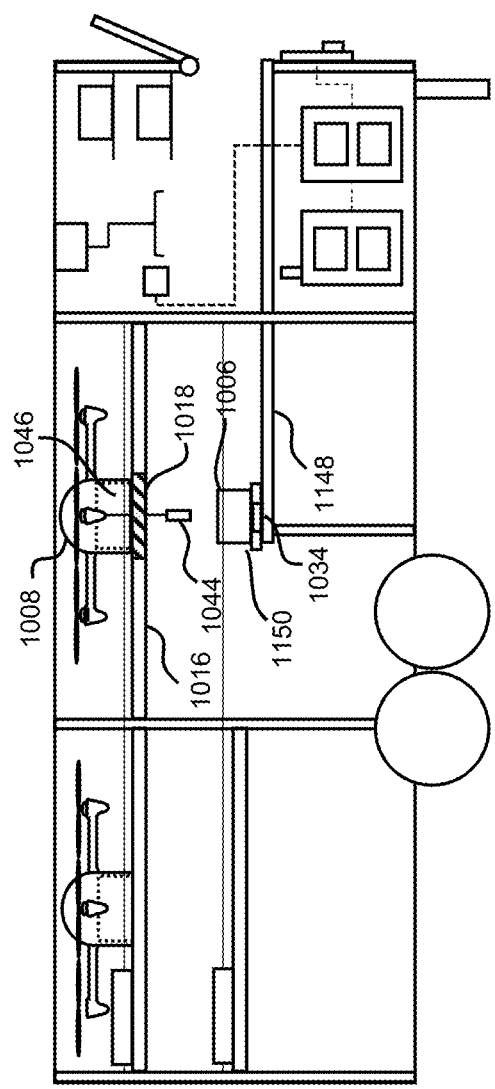
FIG. 11B is a side view of the UAV facility of FIG. 11B at a later time.

The payload positioning mechanism of this example comprises at least one guide rail 1148, similar to the tracks described in relation to FIG. 2, and a tray 1150 moveably mounted on the guide rail. The guide rail 1148 extends between an initial position (in which a user can place the payload 1006 into the tray 1150, and the loading position beneath the platform 1016. To move the payload 1006, a drive mechanism can cause the tray 1150 to move along the length of the guide rail 1148. FIG. 11A shows the payload 1006 and tray 1150 located in an initial position. FIG. 11B shows the payload 1006 and tray 1150 located in the loading position. Once in the loading position, the UAV 1008 can lower a tether and coupling mechanism 1044 to engage the payload.

Figure 12:
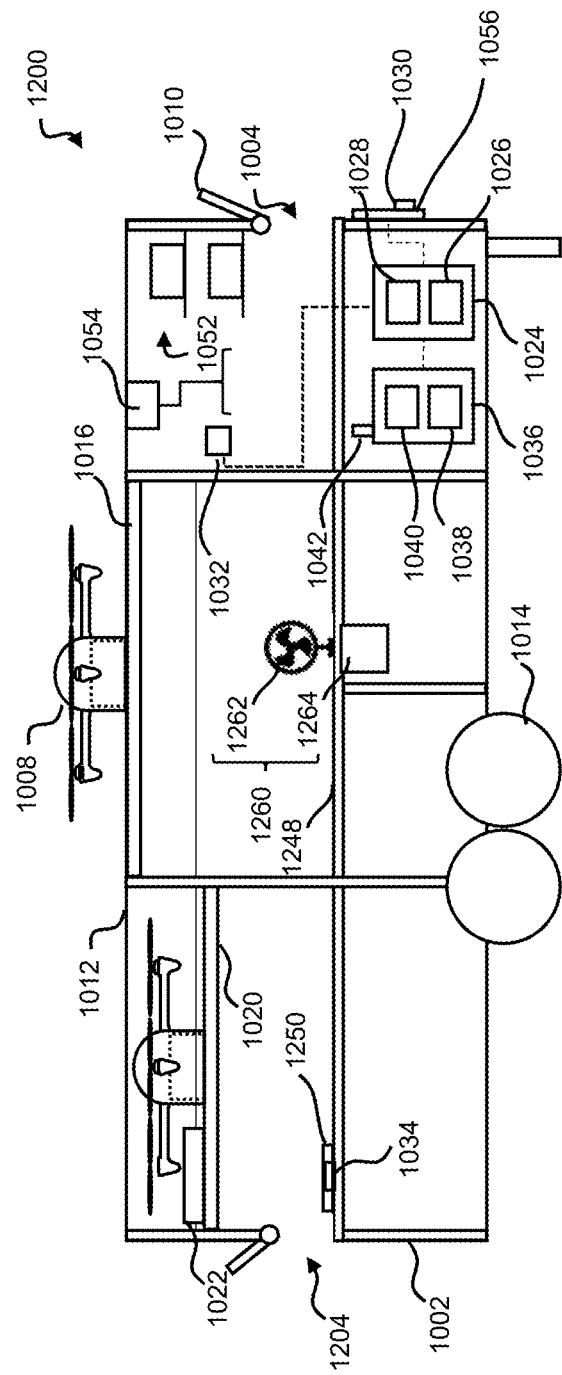
FIG. 12 is a side view of another UAV facility in accordance with an example.

FIG. 12 depicts another UAV facility 1200 which is substantially similar to that described in relation to FIGS. 10A, 10B, 11A and 11B, but has a different payload positioning mechanism. This UAV facility 1200 also comprises a first ingress port 1004 located on one side of the facility 1200, and a second ingress port 1204 located on an opposite side of the facility 1200.

The payload positioning mechanism of this example comprises at least one guide rail 1248 and a tray 1250 moveably mounted on the guide rail 1248. The guide rail 1248 extends between the first ingress port 1004 and the second ingress port 1204. The tray 1250 can move along the length of the guide rail so to receive payloads deposited via both ingress ports 1004.

Figure 13:
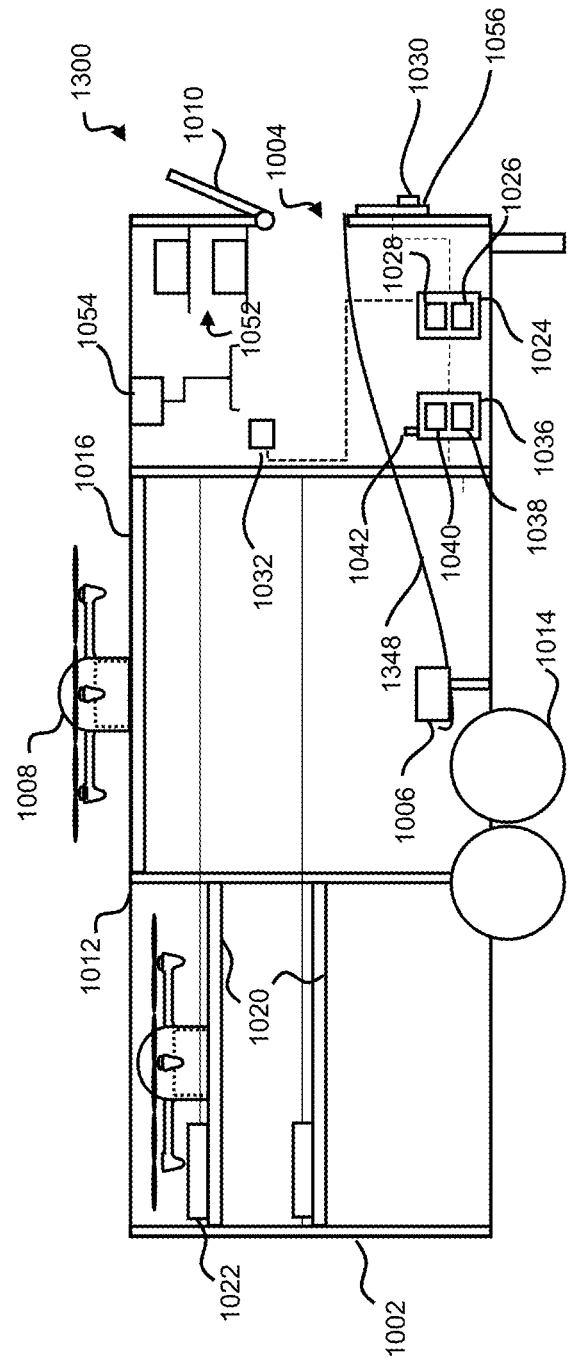
FIG. 13 is a side view of another UAV facility in accordance with an example.

FIG. 13 depicts another UAV facility 1300 which is substantially similar to that described in relation to FIGS. 10A, 10B, 11A, 11B and 12 but has a payload positioning mechanism that is passive in nature. The payload positioning mechanism of this example comprises an inclined surface 1348 extending from the ingress port 1004 and into the housing 1002. A user can place a payload 1006 onto the surface 1348 at an initial position and the payload 1006 moves down the inclined surface into the loading position shown in FIG. 13. A weight sensor (not shown) may be integrated into the inclined surface to measure the weight of the payload 1006.

In another example UAV facility (not shown) the payload positioning mechanism of may comprise a conveyor system e.g. coupled to the base of the UAV facility, to move the payload from an initial position to a loading position. The conveyor system may comprise a conveyor belt/platform and one or more rollers which are driven by one or more motors, to move the conveyor platform. A user can place the payload onto the conveyor platform and the payload can be transported within the housing. A weight sensor may be integrated with the conveyor system to measure the weight of the payload 1006. For example, the weight sensor may be coupled to the conveyor platform such that displacement of the platform generates weight sensor data.

As briefly mentioned above, the UAV facilities may comprise at least one imaging device 1032 configured capture an image of the payload 1006. In one example, the imaging device 1032 is a camera which detects visible light to generate an image the payload 1006. The payload may not, for example, be covered by any packaging materials. In another example, the imaging device detects electromagnetic signals of any wavelength, such as UV, IR or X-ray signals. This can be useful to image a payload 1006 that comprises an item covered by packaging materials, such as the materials of a standard container.

In a particular example, the imaging device comprises an electromagnetic radiation source configured to irradiate the payload and an electromagnetic radiation detector configured to detect an electrometric radiation signature of the payload. For example, X-ray radiation may irradiate the object and an X-ray signature is detected.

In any of these examples, the data recorded by the imaging device is indicative of an image of the payload. Using this image, one or more physical characteristics of the payload can be determined. For example, a shape or size of the item can be established.

FIG. 14A depicts an example image of a payload generated by an X-ray imaging device. The captured image reveals that the payload (such as an object within the container) has a particular shape 1402. The shape 1402 may be described mathematically, for example.

In one example, the payload verification system comprises an image recognition system configured to determine the shape of the payload based on the captured image. The image recognition system may determine that the shape 1402 represents a particular item, such as a child's toy.

To determine whether the payload corresponds to the delivery consignment, the payload verification system can obtain an image of an item associated with the delivery consignment. The payload verification system may use the image recognition system to determine an expected shape of the delivery consignment based on the obtained image of the item. FIG. 14B depicts the expected shape of the delivery consignment based on the obtained image.

The payload verification system can then compare the shape of the payload 1402 with the expected shape of the delivery consignment 1404 to determine whether the payload corresponds to the delivery consignment. If the shapes are mathematically similar (within a certain degree of accuracy) the payload verification system may deduce that the payload corresponds to the delivery consignment.

Additionally, or alternatively, the image recognition system may determine, based on the shape of the payload and the expected shape of the delivery consignment, whether the shapes represent the same item. For example, a database of known shapes may include a model having a similar shape to the shape of the payload 1402 and the shape of the delivery consignment 1404. If both shapes correspond to the same model, payload verification system may deduce that the payload corresponds to the delivery consignment.

As mentioned, the data recorded by the imaging device is indicative of an image of the payload. Using this image, one or more physical characteristics of the payload can be determined. For example, an exterior or outer shape of the container/payload may be determined (rather than, or in addition to the shape of the object(s) within the container). An image recognition system may determine the shape of the payload based on the captured image.

It may be useful to determine the exterior shape of the payload for safety purposes. For example, if the payload has sharp corners, it may be particularly dangerous for the UAV to jettison the payload during an emergency. A payload having more rounded corners could pose less of a threat to humans, animals or property should the payload be jettisoned by the UAV during flight.

Thus, in some examples, the outer shape of the payload is determined, and a safety system/module of the UAV facility may categorize the payload based on its shape. For example, the UAV facility may categorize the payload having a shape that is suitable for jettison or not suitable for jettison. The UAV may base its decision whether to jettison the payload on the categorization determined by the safety system. The UAV may choose to ignore the categorization depending upon the type of emergency. For example, the UAV may nevertheless jettison a payload that has been categorized as not suitable to jettison. The UAV facility may therefore transmit data indicative of the shape and/or categorization to the UAV that is to transport the payload.

In other examples, the exterior or outer shape of the payload/container may be determined by means other than an imaging device. For example, one or more electromagnetic emitting devices and one or more corresponding detectors may determine an outer shape of the payload.

In some UAV facilities, the one or more physical characteristics of the payload comprises an impact resistance of the payload. As previously mentioned, it may be useful to know the payload's impact resistance when delivering a payload. For example, if the payload has a high impact resistance, it may be safe for the UAV to drop the payload from a height, rather than placing the payload on the ground. The impact resistance of the payload may represent the impact resistance of the packaging/container, or it may represent the impact resistance of the object(s)/contents of the container. In one example, the impact resistance represents the overall impact resistance of the payload and thus takes into account the container and object(s) within the container. For example, a payload may be deemed to have a low impact resistance if it is carrying a loose glass vase, even though it is contained within a container that has a relatively high impact resistance.

In an example UAV facility, the detector system is configured to determine the impact resistance of the payload. This may be determined from the physical characteristics of the payload or may be determined from the identification code.

In one example, determining the physical characteristics of the payload comprises imaging the payload and using an image recognition system to determine the impact resistance based on a captured image. For example, the image recognition system may identify a known container and can determine the impact resistance from a database. Alternatively, the image recognition system may identify, estimate or derive the materials and/or structure of the payload. The materials and/or structure may be used estimate the impact resistance of the payload. Alternatively, the UAV facility may comprise one or more components to apply a force to the payload to determine its impact resistance.

In one example, the impact resistance may be determined through use of an identification code. For example, the detector system may obtain an identification code, where the identification code either identifies the payload's impact resistance or the payload's impact resistance is obtainable using the identification. In some examples, the payloads impact resistance is determined through use of an identification code and by determining the physical characteristics of the payload.

However it is determined data indicative of the payload's impact resistance may be transmitted to the UAV that is to deliver the payload. The UAV may make decisions based on this data. For example, if the delivery surface is unsuitable for the UAV land on, the UAV may instead drop the payload from a height if the payload has a relatively high impact resistance. If the delivery surface is unsuitable for the UAV land on, and the payload's impact resistance is relatively low, the UAV may abort delivery.

In certain UAV facilities, the one or more physical characteristics of the payload comprises at least one size dimension of the payload, and the one or more expected characteristics of the delivery consignment comprises at least one expected size dimension of the delivery consignment. Accordingly, the detector system may comprise one or more sensors configured to obtain sensor data associated with the payload. The sensor data can be used by the detector system to determine the least one size dimension of the payload. For example, a size dimension 1406 of the payload can be determined from a captured image 1400 of the payload, as shown in FIG. 14A. An expected size dimension of the delivery consignment can be obtained from a database, or from a remote server as previously described. In one example, the expected size dimension can be determined from an image of the expected delivery consignment. The payload verification system can then compare the size dimension 1406 of the payload with the expected size dimension of the delivery consignment to determine whether the payload corresponds to the delivery consignment. If the sizes are equal (or are within a certain range of each other) the payload verification system may deduce that the payload corresponds to the delivery consignment.

To further enhance the security of any of the above UAV facilities, the detector system may comprise a hazardous material detection system configured to determine whether the payload 1006 comprises hazardous materials. FIG. 12 depicts a particular example of a hazardous material detection system, which acts as an explosive device detection system 1260. In this example, the explosive device detection system comprises a fan 1262 arranged to move fluid, such as air, across the payload, and a detector 1264 arranged to detect whether the air comprises particles associated with explosive or combustible devices. In the event that it is determined that the payload comprises an explosive or combustible device, delivery of the payload can be aborted. The payload may be moved into the storage area 1052 or out of the UAV facility, for example.

Some or all of the above described UAV facilities may also comprise a payload packaging station (not shown). The payload packaging station can package the payload within a container, such as a standard sized container so that the payload can be more easily transported by the UAV. As mentioned earlier, a standard container may have certain dimensions to allow the container to be located within the compartment 1042 of the UAV 1008. The payload packaging station may receive the payload and move the payload into a container. In some examples the container comprises an engagement mechanism to allow the container to be engaged by the coupling mechanism 1044 of the UAV 1008.

In one arrangement, the payload packaging station is configured to determine, based on the identification code, whether the received payload is already packaged in a standard container. This can be deduced based on the identification code. For example, the identification code may be used to identify a business or user which has deposited the payload. Certain businesses or users may always deposit payloads that comprise standard containers. If it is determined that the payload is not already packaged in the standard container, the payload packaging station is configured to package the payload in such a container.

In some examples, the UAV facilities 1000, 1100, 1200, 1300 also comprise components to allow the center of mass of the payload 1006 to be determined. As mentioned above, the center of mass may be useful to know because it can affect the handling of the UAV during flight. Accordingly, the detector system of the UAV facility may comprise a sensor arrangement (such as two or more sensors) configured to obtain sensor data associated with the payload. The detector system may then determine the center of mass of the payload based on the sensor data. Depending upon the location of the center of mass, the payload can be accepted or rejected for delivery.

Figure 15:
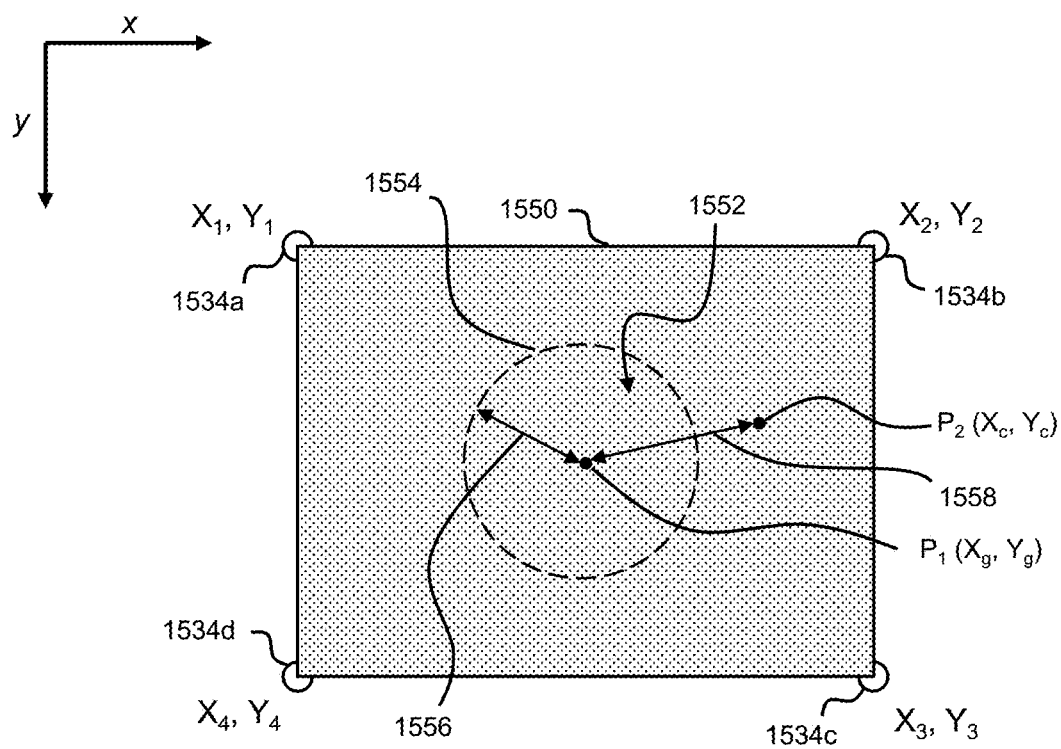
FIG. 15 depicts a plan view of a system to measure the center of mass of a payload in accordance with an example.

FIG. 15 depicts a top-down view of an example tray 1550 onto which the payload (not shown) may be placed. The tray 1550 may replace the trays 1050, 1150, 1250 shown in FIGS. 10A, 10B, 11A, 11B, and 12, for example. Below the tray 1550 (or integrated within the tray) are four sensors 1534a, 1534b, 1534c, 1534d (collectively referred to as sensors 1534). In this particular example, the sensors 1534 are load cells. When a payload is placed on/in the tray 1550, the sensors 1534 measure the force applied by the payload at the location of the sensor 1534. In the example shown, there are four sensors 1534, however in other examples there may be fewer or more sensors. In this particular example, each sensor 1534a . . . d is positioned at, or towards the corners of the rectangular tray 1550. In other examples, the sensors 1534 may be arranged elsewhere.

The sensors 1534 are communicatively coupled to the detector system 1024 and/or the payload verification system 1036. Sensor data recorded by the sensors 1534 may be transmitted to the detector system and/or the payload verification system for further processing.

Position $P_1$ indicates the geometric center of the tray 1550 (and/or the geometric center of the footprint of the payload once placed on the tray). Position $P_1$ is located at coordinate position Xg, Yg, sensor 1534a is located at position $X_1$, $Y_1$, sensor 1534b is located at position $X_2$, $Y_2$, sensor 1534c is located at position $X_3$, $Y_3$, and sensor 1534d is located at position $X_4$, $Y_4$.

Figure 16:
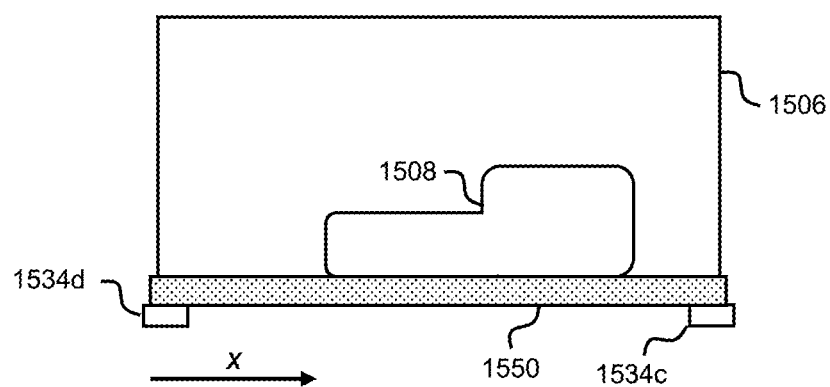
FIG. 16 depicts a side view of a system to measure the center of mass of a payload in accordance with an example.

FIG. 16 depicts a side view of the tray 1550 of FIG. 15 onto which a payload has been placed. The payload of this example comprises a container 1506 and an object 1508 located inside the container 1506. For illustrative purposes, the container 1506 is shown as being transparent, so that the contents of the container 1506 are visible. As shown, the object 1508 has an irregular shape, and is not located centrally within the container 1506. Should the payload be suspended from a UAV by a tether, the container 1506 may tilt to one side.

Once the payload of FIG. 16 has been placed on the tray 1550, different forces will be measured by different sensors 1534. For example, sensors 1534b and 1536c may measure higher forces than sensors 1534a, 1534d because of the way the object 1508 is arranged inside the container 1506. It is therefore possible to calculate the center of mass of the payload using the force sensor data measured by each of the sensors 1534.

The location of the center of mass $P_2$, located at position $X_c$, $Y_c$, may be calculated using the following equations:

$$X_c = \frac{X_1 F_1 + X_2 F_2 + X_3 F_3 + X_4 F_4}{F_1 + F_2 + F_3 + F_4} \quad (1)$$

$$Y_c = \frac{Y_1 F_1 + Y_2 F_2 + Y_3 F_3 + Y_4 F_4}{F_1 + F_2 + F_3 + F_4} \quad (2)$$

Where $F_1$, $F_2$, $F_3$, $F_4$ are the forces measured by the sensors 1534a, 1534b, 1534c, 1534d respectively. The origin may be taken as the location of one of the sensors, or the location $P_1$, for example.

Once the location of the center of mass has been calculated by the detector system 1024, a decision on whether to accept the payload can be made by the payload verification system 1036. To do this, the payload verification system 1036 determines whether the center of mass of the payload satisfies a center of mass criterion. For example, the payload verification system may determine whether the center of mass is located within a predetermined area or located within a predetermined distance from a particular position (such as position $P_1$). FIG. 15 shows a predetermined area 1552 bounded by a circular perimeter 1554, where the predetermined distance is given by radius 1556. The area 1552 is centered around the geometric center of the payload/tray 1550 (i.e. location $P_1$).

In this particular example, the center of mass (i.e. location $P_2$) is located outside of the predetermined area 1552. Thus, the center of mass is located at a distance 1558 away from location $P_1$. Accordingly, the payload may not satisfy the center of mass criterion/requirement. The UAV facility may therefore reject the payload for delivery because it is deemed to be outside of the acceptable range.

In other examples, the center of mass may be located within the predetermined area 1552, at a distance from position $P_1$ that is less than the predetermined distance 1556. In that case the payload may be accepted for delivery because it satisfies the center of mass criterion.

The predetermined distance 1556 and/or the predetermined area 1552 (i.e. the center of mass criterion) may be set by a manufacturer of the UAV facility, or another user for example. In some examples, the predetermined distance 1556 and/or the predetermined area 1552 are dependent upon the mass of the payload. For example, a lighter payload may be accepted for delivery if it is located further away from location $P_1$ than a payload of a higher mass. In some examples, the predetermined distance 1556 and/or the predetermined area 1552 are dependent upon the type of UAV being used to deliver the payload. For example, certain UAVs may have a higher tolerance, and could therefore deliver payloads that other UAVs may not.

In one example, the center of mass criterion is dependent upon one or more weather characteristics. For example, in windy conditions, the center of mass criterion may be stricter. The predetermined area 1552 and distance 1556 may be smaller during high winds, for example.

In certain arrangements, the payload verification system is configured to determine the one or more weather characteristics and determine/select a center of mass criterion based on the determined one or more weather characteristics. For example, the UAV facility may receive, from a remote server, an indication of the one or more weather characteristics. Additionally, or alternatively, the UAV facility may measure the one or more weather characteristics. For example, the UAV facility may comprise one or more instruments (not shown) configured to measure one or more weather characteristics, such as wind speed.

The center of mass criterion may be dependent on one or more factors, such as weather, mass of the payload, type of UAV, battery charge remaining in the UAV, etc. A lookup table may be used to determine the predetermined distance 1556 and/or the predetermined area 1552 when necessary.

In one example, in the event that the center of mass of the payload does not satisfy the center of mass criterion, the UAV facility is configured to adjust a position of the payload. For example, a robotic arm or other mechanism could be used to adjust the position of the object 1508 within the container 1506 in order to adjust the center of mass. After the position of the payload has been adjusted, the detector system may re-test the payload to determine whether the altered center of mass now satisfies the center of mass criterion.

In another example, in the event that the center of mass of the payload does not satisfy the center of mass criterion, a payload positioning mechanism (such as those described in FIGS. 10A, 10B, 11A, 11B, and 12) is configured to move the payload to a location such that a user can adjust a position of the payload. For example, the payload may already be located within the housing of the UAV facility and may need to be moved back to the initial position so that a user can adjust the center of mass of the payload.

In another example, the UAV facility may alert/notify a user to adjust a position of the payload. For example, the user terminal 1056 may notify the user that the payload will be rejected unless the payload is adjusted. The center of mass measurement may take place when the user initially places the payload onto the tray.

If the payload is ultimately rejected for delivery, the payload may be stored in the payload storage facility 1052. This may always occur, or may occur if the user is not available to collect the payload. In another example, in the event that the center of mass of the payload does not satisfy the center of mass criterion, a payload positioning mechanism is configured to move the payload to a location such that a user can collect the payload.

The above described arrangement of sensors allows the center of mass to be calculated in two dimensions (i.e. in the x-y plane). However, the UAV facility may also allow a three-dimensional center of mass measurement to be made. The "vertical" center of mass may be determined by inclining or rotating the payload, and calculating the vertical component of the center of mass using the new center of mass in this second configuration. This can be achieved using the four sensors described above.

An example UAV facility 1000, 1100, 1200, 1300 may comprise an agitator mechanism that agitates the payload to determine whether its center of mass changes after agitation. For example, the object(s) within the container may move if they are loose. If the contents of the container move upon agitation, the center of mass may move as a result. As mentioned, a moving center of mass (rather than a fixed center of mass) may cause problems during flight.

Figure 17:
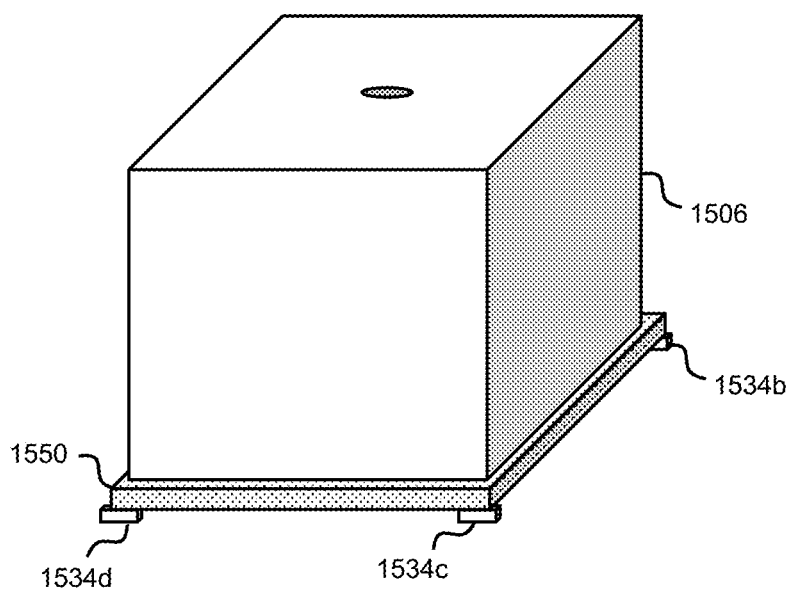
FIG. 17 depicts a perspective view of a system to agitate a payload in accordance with an example.
Figure 18:
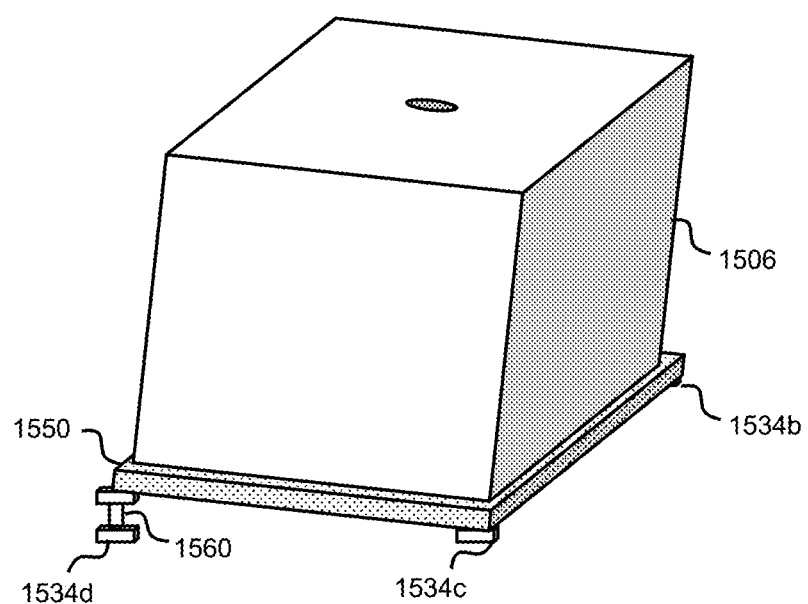
FIG. 18 depicts the system depicted in FIG. 17 arranged in a different configuration.

FIGS. 17 and 18 depict a perspective view of a payload located on/in the tray 1550. FIG. 17 shows the payload in a non-tilted configuration, and FIG. 18 shows the payload in a tilted configuration. As the payload is moved between these two configurations one or more times, the object(s) 1508 within the container 1506 may move. In this way the payload is agitated.

Figure 19A:
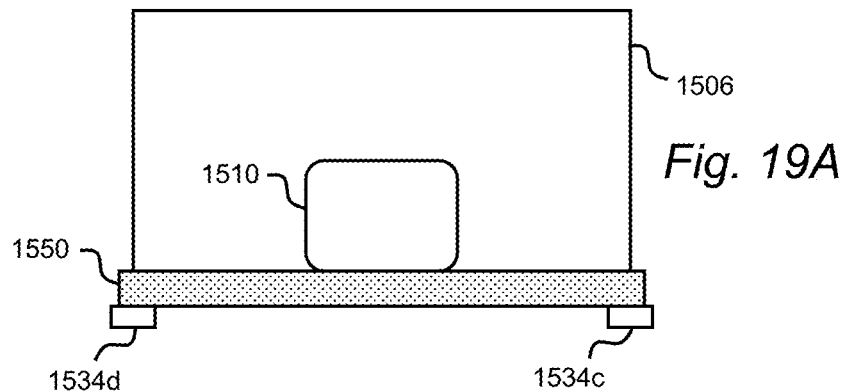
FIG. 19A depicts a side view of the arrangement in FIG. 17.

FIG. 19A depicts a side view of the arrangement in FIG. 17. Again, for illustrative purposes, the container 1506 is shown as being transparent, so that the contents of the container 1506 are visible. In this position, an object 1510 is shown centrally located within the container 1506. The center of mass of the payload may therefore satisfy the center of mass criterion. In this example, however, the object 1510 is loose and its position may shift during transport. So, although it satisfies the center of mass criterion, it may also be useful to check whether the center of mass changes if the payload is moved. A moving payload may cause the UAV to maneuver unpredictably (depending upon the mass of the payload).

Figure 19B:
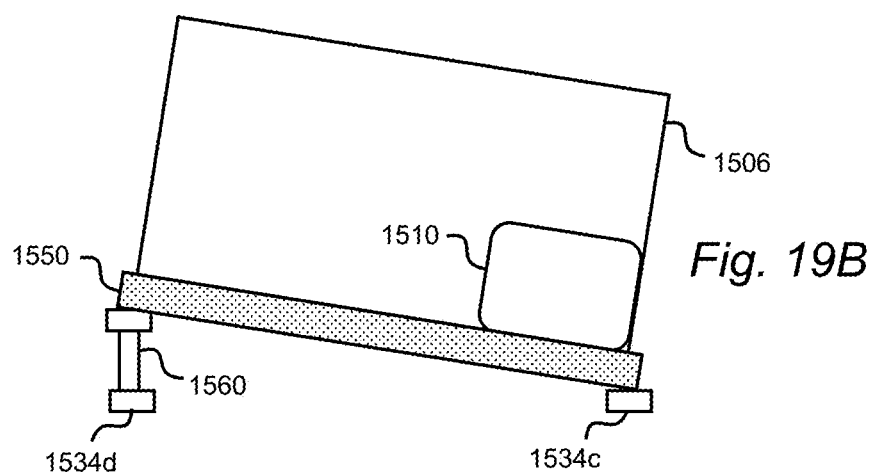
FIG. 19B depicts a side view of the arrangement in FIG. 18.

FIG. 19B depicts a side view of the arrangement in FIG. 18. The payload has been rotated through an angle by an agitator mechanism 1560. The agitator mechanism may comprise an actuator to move or rotate the payload. The motion imparted by the agitator mechanism has caused the loose object 1510 to be moved towards one end of the container 1506.

In the example of FIGS. 18 and 19B, the agitator mechanism is integrated with one or more of the sensors 1534, but in other examples, it may be separate or may be integrated with the payload positioning mechanism.

In another example (not depicted), the payload may be lifted out of the tray 1550, be agitated, and then be placed back in the tray 1550.

The precise nature of the agitation may simulate motion that is experienced during flight. For example, the angle through which the payload is rotated may mimic typical rotation angles that would be experienced during flight. This may provide a more realistic estimate of how the payload will move during delivery.

Figure 19C:
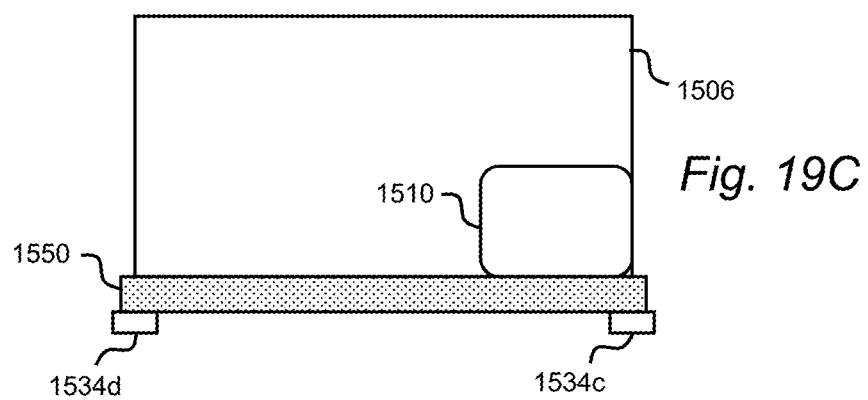
FIG. 19C depicts a side view of the system of FIG. 17 after the payload has been agitated.

FIG. 19C shows a side view of the payload after the payload has been agitated. The object's position is different to that before agitation. After agitation, the detector system may re-test the payload to determine whether the new center of mass differs from the previously determined center of mass. A decision on whether to accept or reject the payload may be taken on that basis.

In some examples, the payload may no longer satisfy the center of mass criterion. In that case, the payload may be rejected for delivery until the object is secured.

In some examples, the payload may still satisfy the center of mass criterion, but may nevertheless be rejected until the object is secured.

In some examples, the center of mass may not differ from the previously determined center of mass (or may differ by less than a predetermined amount/threshold), and the payload may still satisfy the center of mass criterion. In such a case, the payload may be accepted for delivery.

In some examples, the decision whether to reject the payload may also be based on the mass of the payload. For example, a payload having a relatively light mass may be accepted for delivery even if it moves upon agitation.

If the payload is rejected, a user may be notified and/or the payload may be moved to a position that allows the user to collect the payload and/or open the container to secure the object in place. In one example, the UAV facility may automatically secure the position of the object. For example, packing material may be inserted inside the container.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The above embodiments are to be understood as illustrative examples. Further embodiments are envisaged. For example, as noted above, a vending machine can deposit the ordered item into the ingress port of the housing. In such examples the UAV facility may be configured such that the ingress port 1004 can receive items from an output of the vending machine via e.g. a chute or similar, which can be connected between the output of the vending machine and the tray 1050; 1150; 1250, mounted on the guide rail guide rail 1048; 1148; 1248 of the ingress port 1004.

In some examples, the UAV facility comprises a housing having an ingress port arranged to receive a payload for delivery by a UAV, wherein the received payload has one or more physical characteristics and a detector system configured to analyze the received payload to determine the one or more physical characteristics. The facility further comprises a payload verification system, configured to compare the one or more determined physical characteristics with one or more threshold characteristics. The UAV facility is further configured to accept the payload for delivery by a UAV based upon the comparison. For example, the UAV facility may accept the payload if the one or more physical characteristics satisfy one or more threshold criteria. In some examples, the comparison is performed by a remote server, rather than the UAV facility itself.

In one example, the one or more physical characteristics of the payload comprises a weight of the payload and the one or more threshold characteristics comprises a threshold weight. If the weight of the payload is below the threshold (or within a threshold range), the payload may be accepted for delivery. The weight may be determined as described in earlier examples. This may be useful to reject payloads which are deemed too heavy for transport.

In another example, the one or more physical characteristics of the payload comprises a size dimension of the payload and the one or more threshold characteristics comprises a threshold size dimension. If the size of the payload is below the threshold (or within a threshold range), the payload may be accepted for delivery. The size may be determined as described in earlier examples. For example, it may be determined using an imaging device. This may be useful to reject payloads which are deemed too large (or too small) for transport. This may also be useful to reject payloads which negatively impact the aerodynamics of the UAV.

In another example, the one or more physical characteristics of the payload comprises a signature of a signal emitted by the payload and the one or more threshold characteristics comprises a threshold signature of a signal. If the signature of the emitted signal (such as a frequency or power level) is below a threshold signal signature (or within a threshold range), the payload may be accepted for delivery. The signature may be determined as described in earlier examples. For example, it may be determined using an electromagnetic interference detector. This may be useful to reject payloads which emit electromagnetic radiation which may interfere with electronic components on the UAV.

In another example, the one or more physical characteristics of the payload comprises a hazardous material signature and the one or more threshold characteristics comprises a threshold hazardous material signature. If the signature (such as a detection of one or more hazardous materials) is below a threshold (which may be zero), the payload may be accepted for delivery. The detection of hazardous materials may be determined as described in earlier examples. For example, it may be determined using a hazardous material detection system.

In this example UAV facility, the threshold characteristics may be determined based on an identification code. For example, the detector system may be further configured to obtain an identification code, as described in earlier examples. In other examples, the threshold characteristics may be determined by other means. For example, the UAV facility may access a local or remote database to obtain the threshold characteristics.

In these examples, the UAV facility may comprise any or all of the features and components of earlier described UAV facilities. For example, the payload verification system may also determine whether the payload corresponds to a delivery consignment based upon a comparison of the one or more determined physical characteristics with one or more expected characteristics of the delivery consignment, wherein the one or more expected characteristics are determined based upon an obtained identification code. The one or more expected characteristics may be determined as described in earlier examples. The UAV facility may further comprise a payload positioning mechanism, a scanner, a user terminal, a payload packaging station, and/or a payload storage facility.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

Further embodiments are disclosed by reference to the following aspects:

1. A drone delivery system, comprising:
a container including:
a base;
a roof located above the base, the roof including a center section that extends lengthwise along a center of the roof and includes one or more openings,
one or more landing surfaces located adjacent to the center section and structured to allow a drone to land on the one or more landing surfaces;
a plurality of side surfaces located in between the base and the roof;
one or more drone delivery platforms;
a drone positioning system located on top of the roof; and
one or more ingestion ports located on at least one of the side surfaces of the container and structured to receive a delivery package.

2. The drone of aspect 1, wherein the drone includes an extendable cable with an attachment that affixes to the delivery package.

3. The drone delivery system of aspect 1, wherein the one or more drone delivery platforms are located lengthwise along the center of the roof, wherein each drone delivery platform includes a hole covered by a panel, at least one drone delivery platform is movably coupled to one or more vertical bars located inside the container, and at least one drone delivery platform is configured to move up to each opening in the center section and to move down inside the container to a predetermined height above the base.

4. The drone delivery system of aspect 1, wherein at least one ingestion port includes a door and a scanner to scan a code on the delivery package.

5. The drone delivery system of aspect 1, wherein each of the one or more ingestion ports is located below each of the one or more landing surfaces.

6. The drone delivery system of aspect 1, wherein at least one ingestion port is located across from at least one other ingestion port.

7. The drone delivery system of aspect 1, wherein the drone positioning system comprises:
at least two rail guides located on opposite ends of each of the one or more landing surfaces and extending towards the center section; and
at least one bar located at a distal end of each of the one or more landing surfaces and configured to move laterally along the at least two rail guides to move each drone from its landing surface to at least one drone delivery platform located adjacent to the landing surface.

8. The drone delivery system of aspect 7, wherein the drone positioning system includes a plurality of hinges located of top of each rail guide in between the center section and each of the one or more landing surfaces to allow the one or more of landing surfaces to be folded on top of the center section.

9. The drone delivery system of aspect 7, wherein each of the at least two rail guides extends towards the center section and wherein each of the at least two rail guides include a proximal end curved inwards to facilitate positioning of the drone onto at least one drone delivery platform.

10. The drone delivery system of aspect 1, further comprising:
at least one user interface located on at least one side surface, the user interface configured to display an availability of the drones for delivery and configured to open and close one or more doors corresponding to the one or more ingestion ports.

11. The drone delivery system of aspect 1, further comprising:
one or more tracks located above the base of the container; and
one or more holding trays movably coupled to one or more tracks wherein each holding tray in a first position is located adjacent to at least one ingestion port to receive the delivery package and wherein each holding tray is positionable to a location below the hole of at least one of the drone delivery platforms.

12. The drone delivery system of aspect 11, wherein each track runs between two ingestion ports located across from each other.

13. The drone delivery system of aspect 1, wherein the roof includes landing patterns located on top of each of the one or more landing surfaces.

14. The drone delivery system of aspect 1, further comprising:
a plurality of battery charging bays mounted inside the container, wherein each battery charging bay is configured to charge a plurality of batteries.

15. The drone delivery system of aspect 14, wherein each battery charging bay is operable to determine characteristics of each battery.

16. The drone delivery system of aspect 1, further comprising:
a robotic arm movably coupled to one or more holding rails inside the container.

17. The drone delivery system of aspect 16, wherein the robotic arm is a three axis robotic arm.

18. The drone delivery system of aspect 16, wherein the robotic arm is configured to remove a first battery installed in the drone, plug in the first battery in one of the battery charging bays, remove a second battery from one of the battery charging bays, and install the second battery in the drone.

19. The drone delivery system of aspect 1, wherein the container is movable.

20. The drone delivery system of aspect 1, further comprising:
a robot to transfer a package from a store to the drone delivery system.

21. The drone delivery system of aspect 1, wherein the one or more drone delivery platforms are one or more elevator platforms.

22. A method for processing a package, comprising:
selecting a drone to deliver a package from a container;
opening an ingestion port on the container;
receiving the package in a holding tray;
closing the ingestion port;
moving the holding tray with the package to a location below a drone delivery platform including a drone;
affixing the package to an attachment of the drone; and
sending the drone to a destination to deliver the package.

23. The method of aspect 22, wherein the selecting of the drone, the opening of the ingestion port and the closing of the ingestion port is performed by a user interface.

24. The method of aspect 22, wherein
the opening of the ingestion port opens a door of the ingestion port that corresponds to the selected drone, and
the closing of the ingestion port closes the door of the ingestion port that correspond to the selected drone.

25. The method of aspect 22, further comprising:
moving the drone from a landing surface to the drone delivery platform, wherein the drone delivery platform includes a hole covered by a panel;
moving down the drone delivery platform including the drone;
opening the panel to allow the attachment of the drone to access the package in the holding tray located below the hole of the drone delivery platform;
moving up the drone delivery platform with the drone and the package affixed to the attachment; and
closing the panel of the drone delivery platform.

26. The method of aspect 22, wherein the affixing of the package to an attachment of the drone comprises:
lowering from the drone a cable including the attachment to affix the attachment to the package.

27. The method of aspect 22, further comprising:
charging a plurality of batteries in a battery charging bay; and
replacing a first battery of the drone with one of the batteries from a battery charging bay.

28. The method of aspect 27, wherein the battery charging bay scans the battery to determine battery characteristics.

29. The method of aspect 22, further comprising:
scanning the package in the holding tray to obtain information about the package; and
determining delivery related information for the selected drone.

30. The method of aspect 22, further comprising:
confirming that the package is received by the drone.

31. The method of aspect 22, further comprising:
alerting of a non-conformity event that include one or more of absence of a battery in the drone, absence of the drone for delivery, unexpected weather conditions, postponing delivery, and cancelling delivery.

32. The method of aspect 22, wherein the drone delivery platform is an elevator platform.

33. A method for processing a package, comprising:
selecting a drone for delivery of a package;
receiving the package for delivery;
affixing the package to an attachment of the drone; and
sending the drone to a destination to deliver the package.

34. The method of aspect 33, wherein the receiving of the package for delivery comprises:
opening an ingestion port;
receiving the package in a holding tray; and
closing the ingestion port.

35. The method of aspect 34, wherein the affixing of the package to an attachment of the drone comprises:
moving the drone from a landing surface to a drone delivery platform comprising a hole;
moving the holding tray with the package to a location below the hole of the drone delivery platform; and
lowering from the drone a cable including the attachment to affix the attachment to the package.

36. The method of aspect 35, further comprising:
moving the drone delivery platform with the drone, the drone delivery platform including a panel to cover the hole;
opening the panel of the drone delivery platform to allow access to the drone; and
moving the drone delivery platform with the drone and the package.

37. The method of aspect 36, further comprising:
closing the panel of the drone delivery platform.

38. The method of aspect 35, wherein the drone delivery platform is an elevator platform.

39. The method of aspect 34, wherein the selecting of the drone, the opening of the ingestion port and the closing of the ingestion port is performed by a user interface.

40. The method of aspect 34, wherein
the opening of the ingestion port opens a door of the ingestion port that corresponds to the selected drone, and
the closing of the ingestion port closes the door of the ingestion port that correspond to the selected drone.

41. The method of aspect 33, further comprising:
charging a plurality of batteries in a battery charging bay; and
replacing a first battery of the drone with one of the batteries from a battery charging bay.

42. The method of aspect 41, wherein the battery charging bay scans the battery to determine battery characteristics.

43. The method of aspect 33, further comprising:
scanning the package to obtain information about the package; and
determining delivery related information for the selected drone.

44. The method of aspect 33, further comprising:
confirming that the package is received by the drone.

45. The method of aspect 33, further comprising:
alerting of a non-conformity event that include one or more of absence of a battery in the drone, absence of the drone for delivery, unexpected weather conditions, postponing delivery, and cancelling delivery.

What is claimed is:

1. A UAV facility, comprising:
a housing having an ingress port arranged to receive a payload for delivery by a UAV, wherein the received payload has one or more physical characteristics and is associated with a delivery consignment;
a platform arranged to receive the UAV;
a drive system configured to lower the platform, thereby to lower the UAV from a position outside the housing to a position inside the housing;
a detector system, configured to:
analyze the received payload to determine the one or more physical characteristics;
a payload verification system, configured to:
determine whether the payload corresponds to the delivery consignment based upon a comparison of the one or more determined physical characteristics with one or more expected characteristics of the delivery consignment; and
in the event that it is determined that the payload corresponds to the delivery consignment, accept the payload for delivery by the UAV; and
a payload positioning mechanism arranged to move the payload between an initial position and a loading position, wherein:
the loading position is arranged beneath the platform; and
the payload is engageable by the UAV when the payload is at the loading position.

2. The UAV facility of claim 1, wherein the detector system is further configured to obtain an identification code, wherein the identification code identifies the delivery consignment, and wherein the one or more expected characteristics are determined based upon the obtained identification code.

3. The UAV facility of claim 2, wherein the payload verification system is configured to:
obtain the one or more expected characteristics of the delivery consignment, based upon the obtained identification code; and
compare the one or more determined physical characteristics with the one or more expected characteristics.

4. The UAV facility of claim 3, wherein to obtain the one or more expected characteristics of the delivery consignment, the payload verification system is configured to:
receive the one or more expected characteristics from a remote server.

5. The UAV facility of claim 4, wherein to obtain the one or more expected characteristics of the delivery consignment, the payload verification system is further configured to:
transmit, to the remote server, a request for the one or more expected characteristics, wherein the request comprises the identification code.

6. The UAV facility of claim 3, wherein the payload verification system is configured to determine, based on the identification code, an item associated with the delivery consignment, and wherein to obtain the one or more expected characteristics of the delivery consignment, the payload verification system is configured to:
retrieve, from a database, the one or more expected characteristics using data identifying the item, wherein the database comprises data indicating one or more expected characteristics associated with each of a plurality of items, the plurality of items including the determined item.

7. The UAV facility of claim 2, wherein the payload verification system is configured to:
transmit the identification code and the one or more determined physical characteristics to a remote server configured to compare the one or more determined physical characteristics with the one or more expected characteristics;
receive, from the remote server, an indication of a result of the comparison; and
using the received indication, determine whether the payload corresponds to the delivery consignment.

8. The UAV facility of claim 2, wherein the UAV facility further comprises an order receipt system configured to:
transmit the identification code to a remote delivery tracking system, thereby to indicate that the UAV facility has received the payload.

9. The UAV facility of claim 2, wherein the identification code is one of:
a meal order identification code identifying a meal delivery consignment;
an ecommerce identification code identifying an ecommerce delivery consignment;
a medicine identification code identifying a medicine delivery consignment; and
a grocery identification code identifying a grocery delivery consignment.

10. The UAV facility of claim 2, wherein the detector system comprises a scanner configured to read a machine-readable marker located on the payload, thereby to obtain the identification code.

11. The UAV facility of claim 10, wherein the scanner is arranged outside of the housing.

12. The UAV facility of claim 2, further comprising a payload packaging station, configured to:
receive the payload; and
package the payload in a container, the container being dimensioned to be transported by the UAV;
wherein the payload packaging station is configured to:
determine, based on the identification code, whether the received payload is already packaged in a standard container, wherein the standard container comprises an engagement mechanism configured to engage a coupling mechanism of the UAV; and
in the event that it is determined that the payload is not already packaged in the standard container, package the payload in the container.

13. The UAV facility of claim 1, wherein the payload positioning mechanism comprises:
a retractable arm, the retractable arm being moveable between an extended position and a retracted position; and
a tray to receive the payload, wherein the tray is mounted on the retractable arm;
wherein when the retractable arm is arranged in the extended position, the tray is positioned to receive the payload at the initial position, and wherein when the retractable arm is arranged in the retracted position the tray is positioned beneath the platform.

14. The UAV facility of claim 13, wherein when the retractable arm is arranged in the extended position the retractable arm extends out of the housing.

15. The UAV facility of claim 13, wherein:
the ingress port is a first ingress port, and the housing comprises a second ingress port; and
the at least one guide rail extends between the first ingress port and the second ingress port.

16. The UAV facility of claim 13, wherein:
the one or more physical characteristics of the payload comprises a weight of the payload;
the one or more expected characteristics of the delivery consignment comprises an expected weight of the delivery consignment;
the detector system comprises a weight sensor configured to obtain weight sensor data associated with the payload;
the detector system is configured to determine the weight of the payload based on the weight sensor data; and
the weight sensor is coupled to the tray such that displacement of the tray generates the weight sensor data.

17. The UAV facility of claim 1, wherein the payload positioning mechanism comprises:
at least one guide rail extending between at least the initial position and the loading position; and
a tray to receive the payload, wherein the tray is moveably mounted on the at least one guide rail, thereby facilitating movement of the payload from the initial position to the loading position.

18. The UAV facility of claim 1, wherein the payload positioning mechanism comprises a conveyor system configured to move the payload from the initial position to the loading position.

19. The UAV facility of claim 18, wherein:
the one or more physical characteristics of the payload comprises a weight of the payload;
the one or more expected characteristics of the delivery consignment comprises an expected weight of the delivery consignment;
the detector system comprises a weight sensor configured to obtain weight sensor data associated with the payload;
the detector system is configured to determine the weight of the payload based on the weight sensor data;

the conveyor system comprises a moveable conveyor platform; and the weight sensor is coupled to the conveyor platform such that displacement of the conveyor platform generates the weight sensor data.

20. The UAV facility of claim 1, wherein:

the one or more physical characteristics of the payload comprises a weight of the payload;

the one or more expected characteristics of the delivery consignment comprises an expected weight of the delivery consignment;

the detector system comprises a weight sensor configured to obtain weight sensor data associated with the payload; and the detector system is configured to determine the weight of the payload based on the weight sensor data.

21. The UAV facility of claim 1, wherein the detector system comprises:

at least one imaging device, configured capture an image of the payload;

wherein at least one of the one or more physical characteristics of the payload are derivable from the captured image.

22. The UAV facility of claim 21, wherein the imaging device comprises:

an electromagnetic radiation source configured to irradiate the payload; and an electromagnetic radiation detector, configured to detect an electrometric radiation signature of the payload, thereby to generate the captured image.

23. The UAV facility of claim 21, wherein the one or more physical characteristics of the payload comprises a shape of the payload, and wherein the one or more expected characteristics of the delivery consignment comprises an expected shape of the delivery consignment; and the payload verification system comprises an image recognition system configured to determine the shape of the payload based on the captured image.

24. The UAV facility of claim 21, wherein:

the one or more physical characteristics of the payload comprises an exterior shape of the payload; and the detector system comprises:

an image recognition system configured to determine the exterior shape of the payload based on the captured image; and a safety system configured to categorize the payload, based on the exterior shape, as being one of:

suitable to jettison by the UAV during flight; and not suitable to jettison by the UAV during flight.

25. The UAV facility of claim 1, wherein the one or more physical characteristics of the payload comprises at least one size dimension of the payload, and wherein the one or more expected characteristics of the delivery consignment comprises at least one expected size dimension of the delivery consignment; and the detector system comprises one or more sensors configured to obtain sensor data associated with the payload, and wherein the detector system is configured to determine the least one size dimension of the payload based on the sensor data.

26. The UAV facility of claim 1, wherein the detector system further comprises an electromagnetic interference detector configured to:

detect a signal emitted by the payload; and determine, based on the signal, whether the payload would cause electromagnetic interference with electronic components of the UAV.

27. The UAV facility of claim 1, wherein the detector system further comprises a hazardous material detection system configured to determine whether the payload comprises hazardous material.

28. The UAV facility of claim 27, wherein the hazardous material detection system comprises:

a fan arranged to cause fluid to move relative to the payload; and a detector arranged to detect whether the fluid comprises particles associated with explosive or combustible devices.

29. The UAV facility of claim 1, further comprising a user terminal arranged outside of the housing, wherein the user terminal is configured to:

receive authentication data; and provide access to the ingress port based on the authentication data.

30. The UAV facility of claim 1, further comprising a payload packaging station, configured to:

receive the payload; and package the payload in a container, the container being dimensioned to be transported by the UAV.

31. The UAV facility of claim 1, wherein the housing comprises a payload storage facility and the payload positioning mechanism is further arranged to:

move the payload from the initial position to the payload storage facility, thereby to store the payload for period of time; and move the payload from the payload storage facility to the loading position after the period of time has passed.

32. The UAV facility of claim 1, wherein:

the one or more physical characteristics of the payload comprises a center of mass of the payload;

the detector system comprises two or more sensors configured to obtain sensor data associated with the payload; and the detector system is configured to determine the center of mass of the payload based on the sensor data.

33. The UAV facility of claim 32, wherein:

the payload verification system is configured to determine whether the center of mass of the payload satisfies a center of mass criterion; and in the event that the center of mass of the payload satisfies the center of mass criterion, the UAV facility is configured to accept the payload for delivery by the UAV.

34. The UAV facility of claim 33, wherein:

the center of mass criterion is dependent upon one or more weather characteristics.

35. The UAV facility of claim 34, wherein the payload verification system is configured to:

determine the one or more weather characteristics; and determine the center of mass criterion based on the determined one or more weather characteristics.

36. The UAV facility of claim 32, wherein:

the payload verification system is configured to determine whether the center of mass of the payload satisfies a center of mass criterion; and in the event that the center of mass of the payload does not satisfy the center of mass criterion, the UAV facility is configured to reject the payload for delivery by the UAV.

37. The UAV facility of claim 36, wherein in the event that the center of mass of the payload does not satisfy the center of mass criterion, the UAV facility is configured to adjust a position of the payload; and after the position of the payload has been adjusted:
the detector system is configured to obtain second sensor data associated with the payload;
the detector system is configured to determine a second center of mass of the payload based on the second sensor data; and
the payload verification system is configured to determine whether the second center of mass of the payload satisfies the center of mass criterion.

38. The UAV facility of claim 36, wherein in the event that the center of mass of the payload does not satisfy the center of mass criterion, a payload positioning mechanism is configured to move the payload to a location such that a user can adjust a position of the payload.

39. The UAV facility of claim 32, further comprising a payload positioning mechanism to move the payload between an initial position and a loading position, wherein:
the payload positioning mechanism comprises a tray to receive the payload;
the tray is moveable between the initial position and the loading position;
the payload is received at the initial position and is engageable by the UAV at the loading position; and
the two or more sensors are coupled to the tray such that displacement of the tray generates the sensor data.

40. The UAV facility of claim 32, wherein:
the UAV facility comprises an agitator mechanism configured to agitate the payload after the detector system has determined the center of mass of the payload;
after the payload has been agitated:
the detector system is configured to obtain third sensor data associated with the payload;
the detector system is configured to determine a third center of mass of the payload based on the third sensor data; and
the payload verification system is configured to determine whether the third center of mass is substantially the same as the previously determined center of mass.

41. The UAV facility of claim 1, wherein:
the one or more physical characteristics of the payload comprises an impact resistance of the payload; and
the detector system is configured to determine the impact resistance of the payload; and
the UAV facility is configured to transmit, to the UAV, data indicative of the impact resistance.

42. A UAV facility, comprising:
a housing having an ingress port arranged to receive a payload for delivery by a UAV, wherein the received payload has one or more physical characteristics;
a platform arranged to receive the UAV;
a drive system configured to lower the platform, thereby to lower the UAV from a position outside the housing to a position inside the housing;
a detector system, configured to:
obtain an identification code, wherein the identification code identifies a delivery consignment; and
analyze the received payload to determine the one or more physical characteristics;
a payload verification system, configured to:
determine whether the payload corresponds to the delivery consignment based upon a comparison of the one or more determined physical characteristics with one or more expected characteristics of the delivery consignment, wherein the one or more expected characteristics are determined based upon the obtained identification code; and
in the event that it is determined that the payload corresponds to the delivery consignment, accept the payload for delivery by the UAV; and
a payload positioning mechanism arranged to move the payload between an initial position and a loading position, wherein:
the loading position is arranged beneath the platform; and
the payload is engageable by the UAV when the payload is at the loading position.

43. A UAV system, comprising:
a UAV configured to deliver a payload, wherein the payload has one or more physical characteristics and is associated with a delivery consignment, and wherein the UAV comprises a detector system configured to analyze the payload to determine the one or more physical characteristics;
a UAV facility, comprising:
a housing having an ingress port arranged to receive the payload for delivery by the UAV;
a platform arranged to receive the UAV;
a drive system configured to lower the platform, thereby to lower the UAV from a position outside the housing to a position inside the housing; and
a payload positioning mechanism arranged to move the payload between an initial position and a loading position, wherein:
the loading position is arranged beneath the platform; and
the payload is engageable by the UAV when the payload is at the loading position; and
a payload verification system, configured to:
determine whether the payload corresponds to the delivery consignment based upon a comparison of the one or more determined physical characteristics with one or more expected characteristics of the delivery consignment; and
in the event that it is determined that the payload corresponds to the delivery consignment, accept the payload for delivery by the UAV.

44. The UAV system of claim 43, wherein the UAV comprises the payload varication system.

* * * * *